US009481141B2

(12) United States Patent
Boegli

(10) Patent No.: US 9,481,141 B2
(45) Date of Patent: Nov. 1, 2016

(54) DEVICE FOR EMBOSSING WRAPPING FOILS

(75) Inventor: Charles Boegli, Marin (CH)

(73) Assignee: Boegli-Gravures SA, Marin (CH)

( * ) Notice: Subject to any disclaimer, the term of this patent is extended or adjusted under 35 U.S.C. 154(b) by 1073 days.

(21) Appl. No.: 13/522,897

(22) PCT Filed: Feb. 1, 2011

(86) PCT No.: PCT/EP2011/051417
§ 371 (c)(1),
(2), (4) Date: Jul. 18, 2012

(87) PCT Pub. No.: WO2011/098376
PCT Pub. Date: Aug. 18, 2011

(65) Prior Publication Data

US 2012/0292821 A1 Nov. 22, 2012

(30) Foreign Application Priority Data

Feb. 9, 2010 (EP) .................................... 10405023

(51) Int. Cl.
*B29C 59/02* (2006.01)
*B31F 1/07* (2006.01)

(52) U.S. Cl.
CPC .......... *B31F 1/07* (2013.01); *B31F 2201/0733* (2013.01); *B31F 2201/0738* (2013.01); *B31F 2201/0746* (2013.01)

(58) Field of Classification Search
CPC ................ B31F 2201/0746; B31F 2201/0751
See application file for complete search history.

(56) References Cited

U.S. PATENT DOCUMENTS 5,007,271 A 4/1991 Boegli
6,176,819 B1 1/2001 Boegli et al.
7,036,347 B2 5/2006 Boegli
2004/0011107 A1 1/2004 Boegli
2006/0285184 A1* 12/2006 Phillips et al. .................. 359/2
(Continued)

FOREIGN PATENT DOCUMENTS

CN 1469801 A 1/2004
EP 1867470 A1 12/2007
(Continued)

OTHER PUBLICATIONS

International Search Report and Written Opinion for PCT/EP2011/051417; May 27, 2011; 7 pgs.
Office Action in Chinese application No. 201180008773.9; Aug. 8, 2013; 19 pages.

*Primary Examiner* — Alison L Hindenlang
*Assistant Examiner* — Kimberly A Stewart
(74) *Attorney, Agent, or Firm* — Foley & Lardner LLP

(57) ABSTRACT

The device for embossing wrapping foils comprises an embossing roller and two counter-rollers, one of which is driven via a drive, the embossing and the counter-rollers being designed in a pinup-pinup configuration, at least the embossing roller having teeth that project from the roller cylinder in the so-called pinup-pinup configuration and the teeth being pyramidal or conical and at least partly also serving for driving the counter-rollers, whereby the embossing roller and counter-rollers are designed for embossing logos on a foil strip and, for being utilizable in an online process, comprise means to avoid a pitching movement of the embossing roller independently of the number and length of gaps in or between logos and of the width of the foil strip.

19 Claims, 19 Drawing Sheets

(56) References Cited

U.S. PATENT DOCUMENTS

| | | | | |
|---|---|---|---|---|
| 2007/0289701 | A1* | 12/2007 | Boegli | 156/209 |
| 2008/0116610 | A1 | 5/2008 | Boegli | |
| 2009/0050001 | A1 | 2/2009 | Boegli | |
| 2009/0243144 | A1* | 10/2009 | Abiru et al. | 264/212 |
| 2010/0269839 | A1* | 10/2010 | Kaljura et al. | 131/58 |

FOREIGN PATENT DOCUMENTS

| | | | |
|---|---|---|---|
| EP | 1925443 | A1 | 5/2008 |
| EP | 2027994 | A2 | 2/2009 |
| WO | WO 02/070243 | A1 | 9/2002 |
| WO | WO 02/076716 | A1 | 10/2002 |
| WO | WO-2009/155720 | A1 | 12/2009 |

* cited by examiner

*Fig. 5*
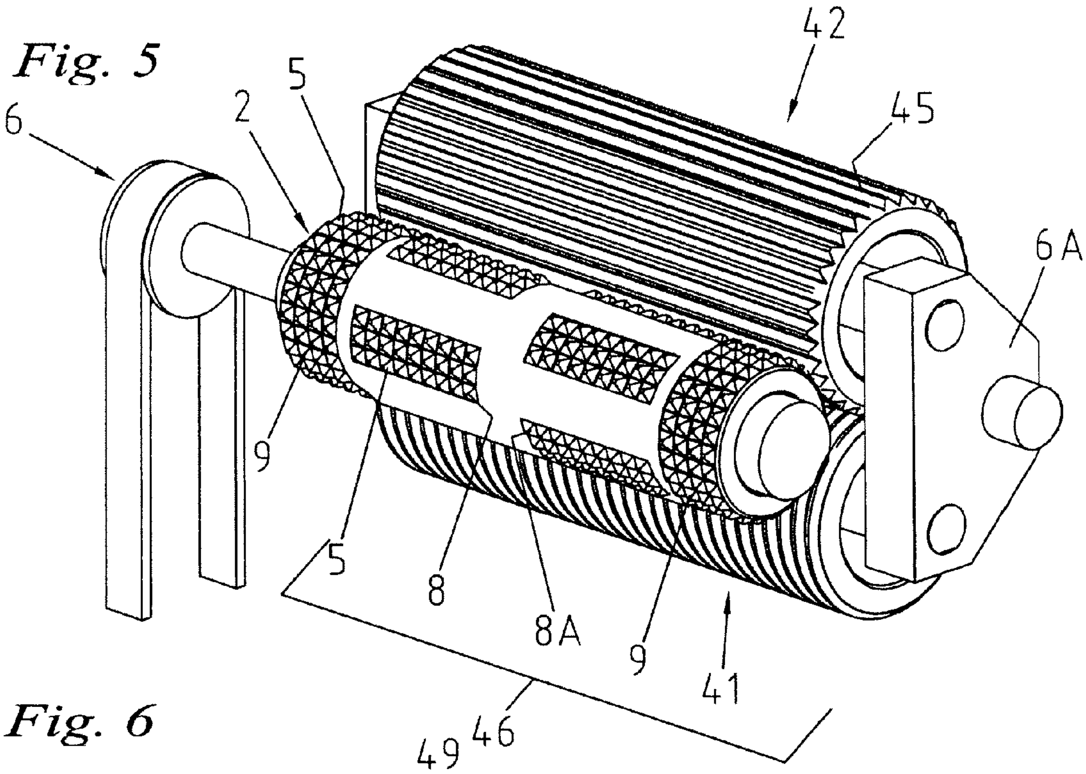
*Fig. 6*
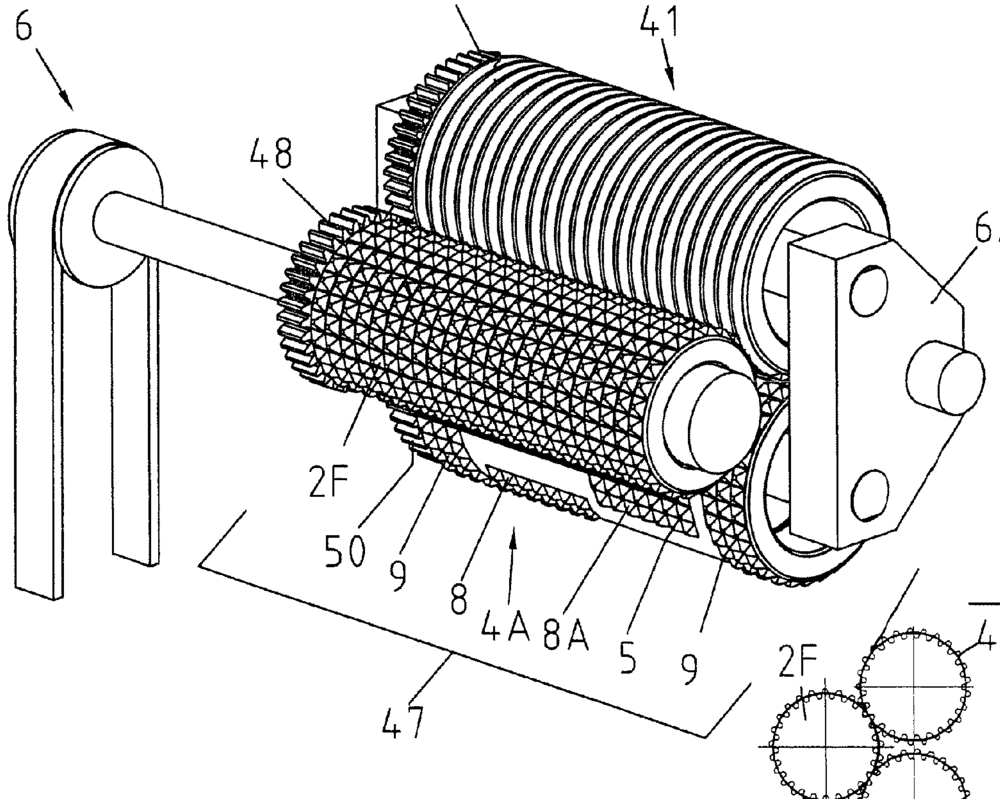
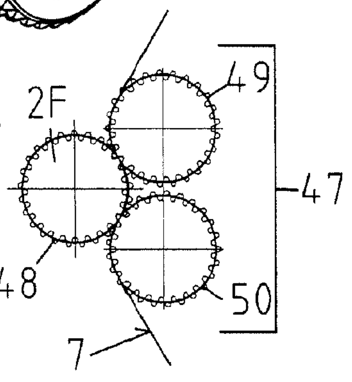
*Fig. 6A*

R2B R3Q

R2A R3R

R2B R3S

R2G R3X

R2H R3Y

R2J R3Z

*Fig. 23*
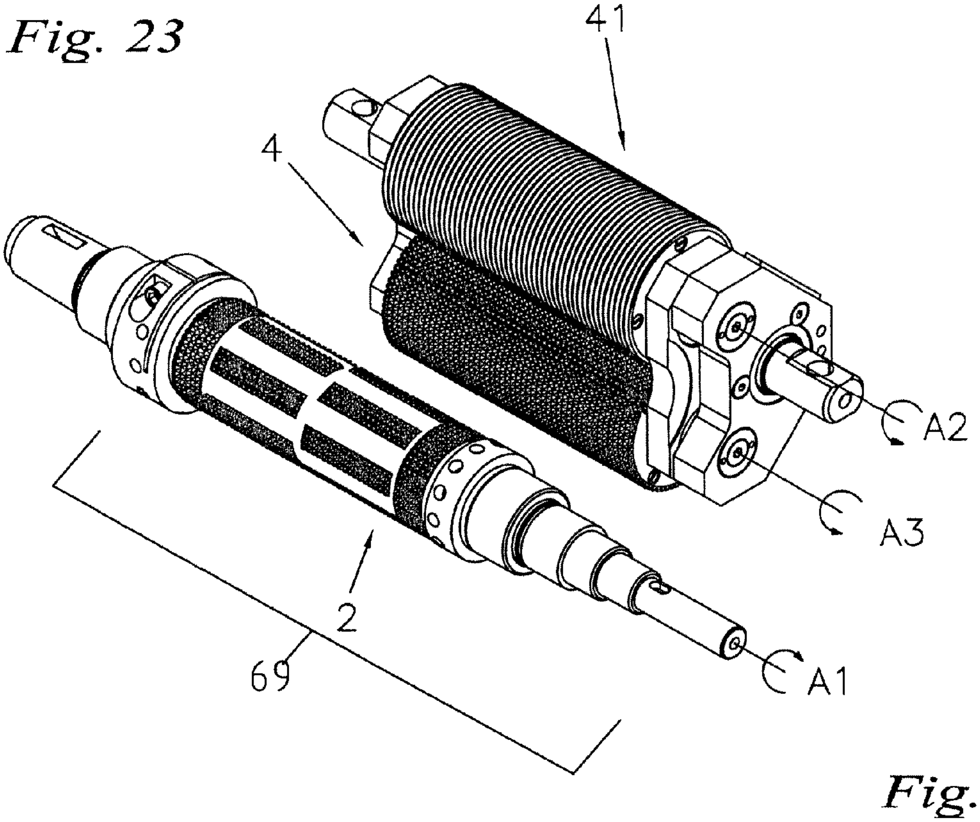
*Fig. 24*
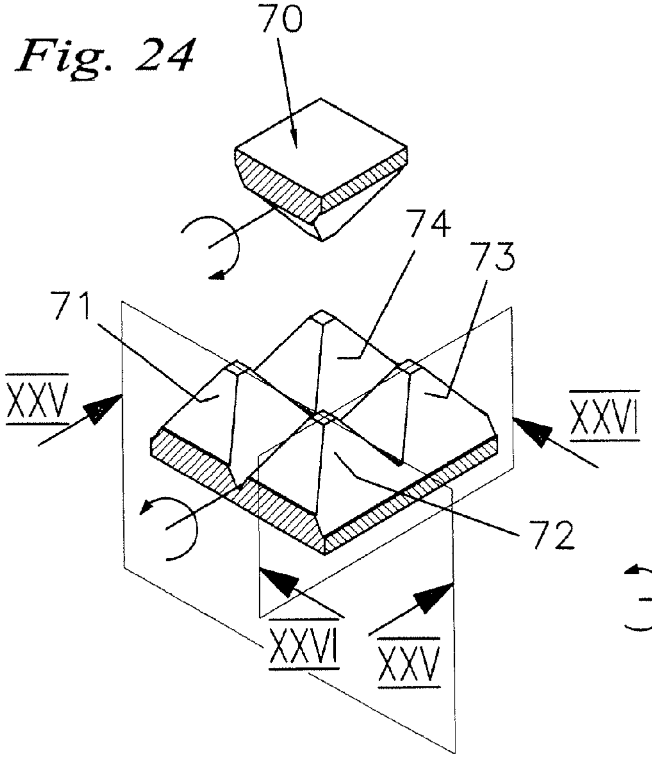
*Fig. 25*
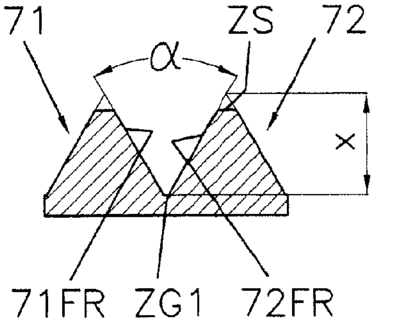
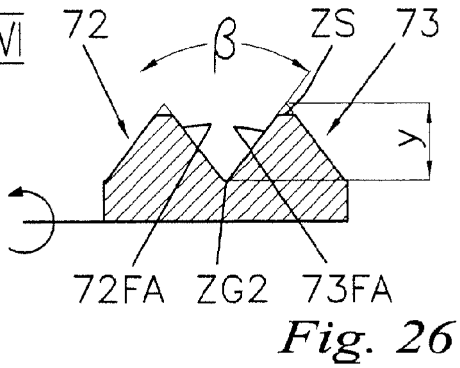
*Fig. 26*

Fig. 27
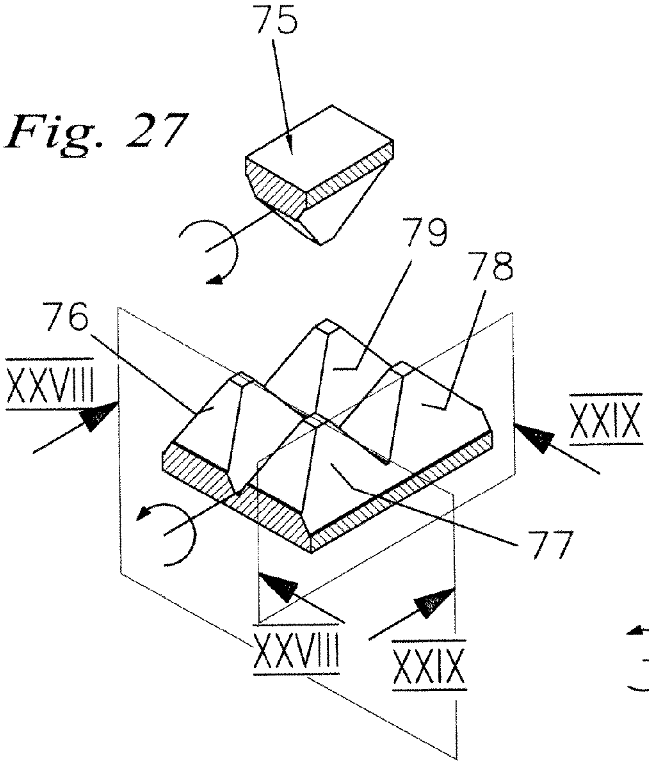
Fig. 28
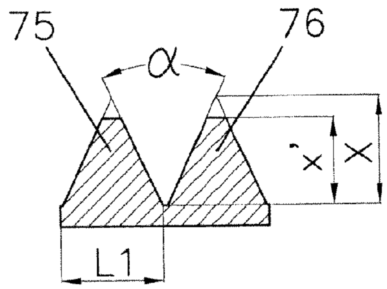
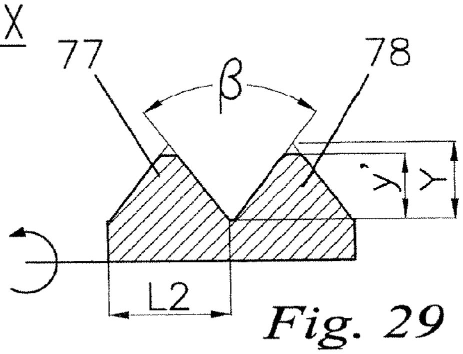
Fig. 29
Fig. 30
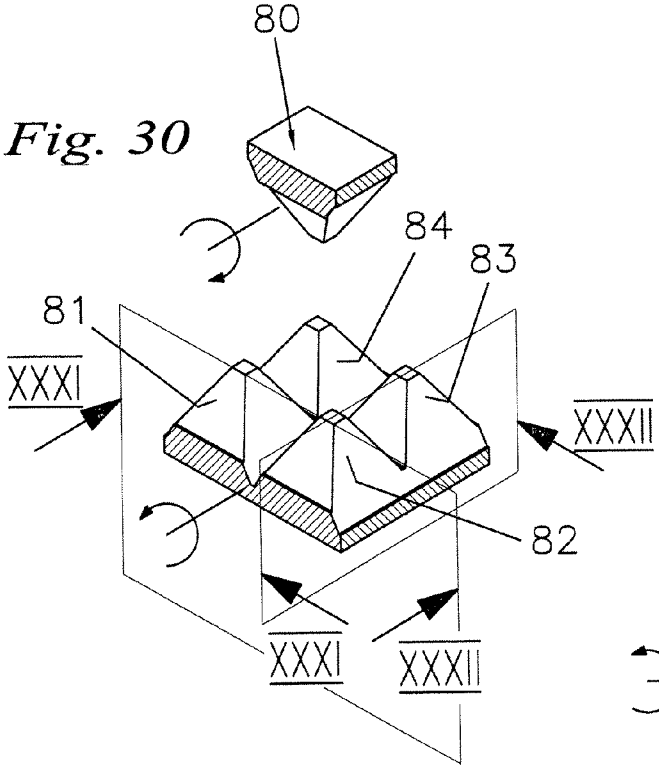
Fig. 31
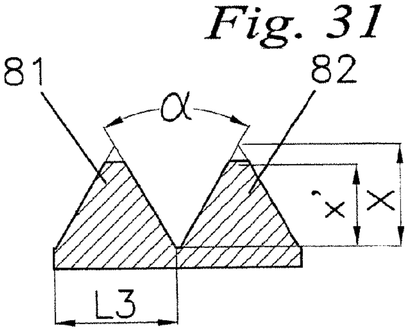
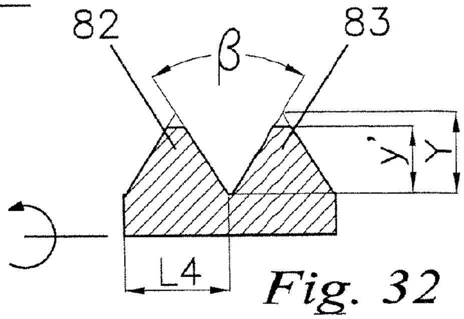
Fig. 32

*Fig. 44*
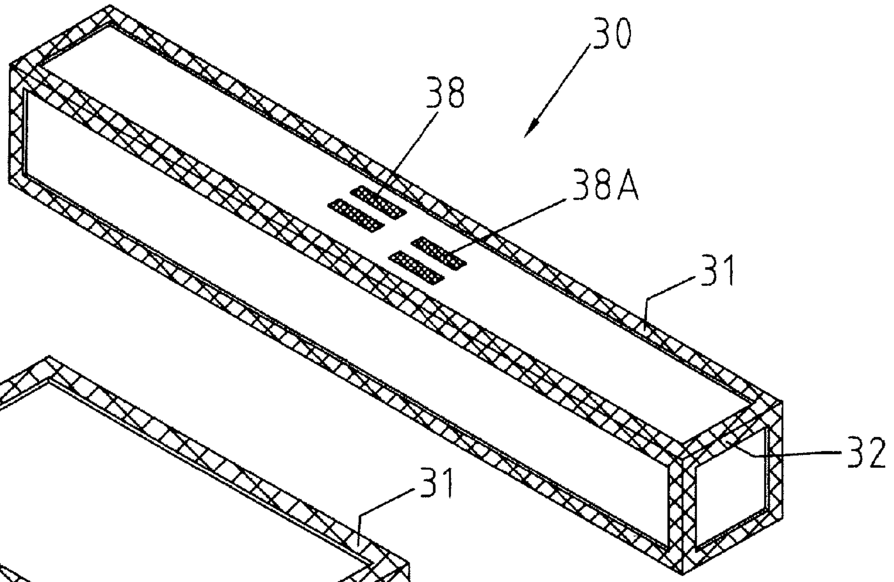
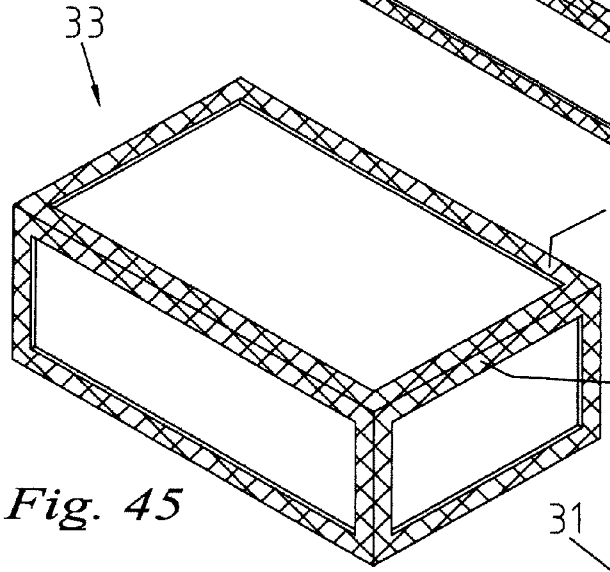
*Fig. 45*
*Fig. 46*
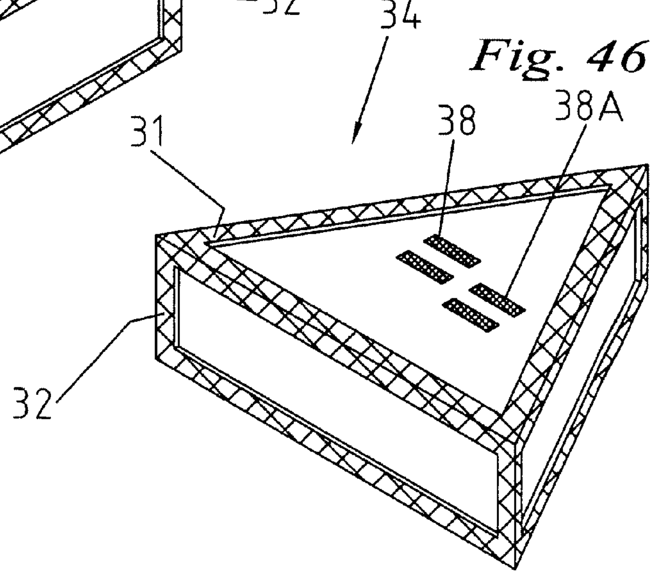
*Fig. 47*
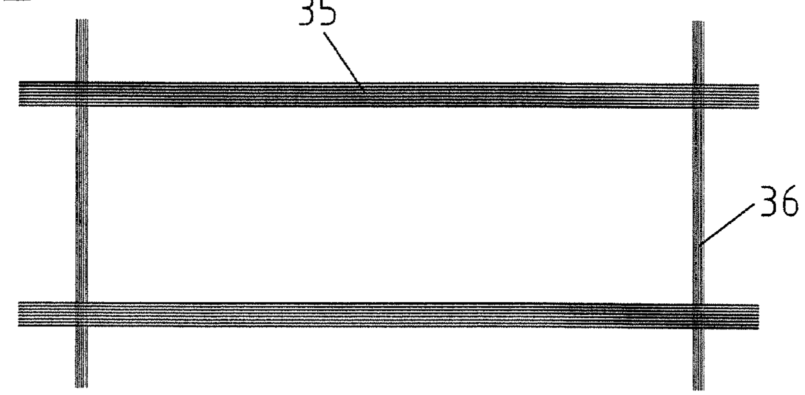

DEVICE FOR EMBOSSING WRAPPING FOILS

CROSS-REFERENCE TO RELATED APPLICATIONS

This application is the National Phase of PCT/EP2011/051417, filed Feb. 1, 2011, which claims priority to European Application No. 10405023.2, filed Feb. 9, 2010. The contents of the foregoing applications are incorporated by reference in their entirety.

FIELD OF INVENTION

The present invention relates to a device for embossing wrapping foils, comprising at least one embossing roller and at least one counter-roller, one of which is driven via a drive, whereby the embossing roller(s) and the counter-roller(s) are designed in a pinup-pinup configuration, at least the embossing roller(s) having teeth that project from the roller cylinder, the teeth of the embossing roller(s) being pyramidal or conical and at least partly also serving for driving the counter-roller(s). and to the use of the device for the online production of tippings in an installation for the manufacture of cigarette packets. Such wrapping foils from paper or synthetic materials, or hybrid foils where e.g. a sputtered metal layer is enclosed between synthetic and/or paper layers, can be used for cigarette mouthpieces or for packaging boxes or the like. In the following, the wrapping foil for a cigarette mouthpiece, also known as the tipping paper, will be called "tipping".

BACKGROUND OF THE INVENTION

Until recently, as the tipping, either a colored or a white piece of paper cut to size has been used to wrap the mouthpiece region. Lately, the tipping has also been provided with signs or logos analogously to satinizing and embossing signs or authentication features on packaging foils. In the following, authentication features, signs, words, logotypes or the like will be called "logos".

According to the prior art, tippings are embossed offline, i.e. not in time with a packing line for cigarettes where tobacco products are supplied on one side and finished, packaged cigarette packets are output on the other side. In this process, a device having two embossing rollers is used whose width is, compared to embossing innerliners relatively great and between which a relatively wide foil strip is passed on which multiple tipping strips, generally at least three, are simultaneously embossed. The strips are subsequently separated and shipped to the operators of packing lines.

Embossing tippings in an offline process with wide embossing rollers and multiple tipping strips offers the advantage, among others, that the foil is not subject to warping and the risk of a pitching movement of the roller is small, but the advantages would prevail if both tippings and wrapping foils for a number of further applications could be embossed online. Also, in addition to the far greater flexibility of the entire packing process, a superior precision of the embossing operation results.

On the other hand, a device for embossing foils according to the preamble of claim 1 is disclosed in the EP 1 867 470 A1 to the same applicant. In FIG. 10, 10A rollers are shown that comprise only few logos and therefore, as shown in the drawings, there is a possibility that the embossing is not totally even over the whole surface.

A further device for embossing foils is disclosed in EP 2 027 994 A2 to the same applicant, with zone with logos that are comparatively small. Increasing the zones of logos, with only few logos, resp. teeth can lead to situations where the embossing is not even over the surface, resulting in a loss of quality.

SUMMARY OF THE INENTION

On this background, it is the object of the present invention to provide a device and uses thereof that allow embossing a large range of wrapping foils online, in particular also relatively small tipping strips, and also foils with logos comprising few teeth, without any loss of quality. This is accomplished by a device wherein the embossing roller(s) and counter-roller(s) are designed for embossing logos and/or reinforcements on a foil strip and, for being utilizable in an online process, comprise means to avoid a pitching movement of the embossing roller(s) independently of the number and length of gaps in or between logos and/or reinforcement lines and rows, and of the width of the foil strip and by use of the device, whereby the device is connected to a gluing and cutting unit, and the individual cigarettes with the tipping either being delivered to a feeding robot and from there to the packing line, or directly to the packing line.

Further objects and advantages such as e.g. the fact that the wrapping foils are not subject to curling and tubing in the online process either, or the production of embossed reinforced portions in critical locations, are indicated in the dependent claims.

BRIEF DESCRIPTION OF THE DRAWINGS

The invention will be explained in more detail hereinafter with reference to drawings of exemplary embodiments.

FIG. 5 shows a variant of the example of FIG. 4, FIG. 6 shows another exemplary embodiment of the device of the invention, FIG. 6A shows a synchronizing gear of FIG. 6 in a sectional view, FIG. 23 shows, in a further exemplary embodiment of the invention, a part of a device in a perspective view, FIG. 24 schematically shows the shape and arrangement of teeth of embossing rollers in a perspective view and in a further enlarged view, FIG. 25 shows a section according to line XXV-XXV in FIG. 24, FIG. 26 shows a section according to line XXVI-XXVI in FIG. 24, FIG. 27 shows a variant of the schematic shape and arrangement of teeth in an enlarged detail and in perspective view, FIG. 28 shows a section according to line XXVIII-XXVIII in FIG. 27, FIG. 29 shows a section according to line IXXX-IXXX in FIG. 27, FIG. 30 shows another variant of the schematic shape and arrangement of teeth in an enlarged detail and in perspective view, FIG. 31 shows a section according to line XXXI-XXXI in FIG. 30, FIG. 32 shows a section according to line XXXII-XXXII in FIG. 30, FIG. 44 shows a wrapped box provided with a logo and with reinforced edges, FIG. 45 shows a box having reinforced edges, FIG. 46 shows a triangular box provided with a logo and with reinforced edges, and FIG. 47 shows an embossed pattern on a wrapping foil.

Embossing so-called innerliners for packaging a number of cigarettes, e.g. 20 pieces, by means of an embossing roller arrangement in a so-called pinup-pinup configuration is known from a large number of patents and patent applications to the applicant of the present invention, e.g. from U.S. Pat. Nos. 5,007,271, 6,176,819, or 7,036,347. The embossing units described therein have in common that they comprise at least one roller pair of which the first roller is driven by a drive, e.g. via a belt from the installation or by a motor, and this driven roller drives the counter-roller(s) by its teeth via the foil that passes between them.

In these devices, the metallized surface of the foil is satinized, i.e. provided with a very large number of small indentations which produce a diffuse reflection of the impinging light. By omitting teeth, a logo is created either as part of the non-embossed, shiny foil surface or as embossed foil surface portions producing various optical effects depending on the light incidence.

Furthermore, WO-02/076716 A1 or EP 2 027 994 A2 to the applicant of the present invention disclose an embossing unit that is composed of three rollers and where in the case that all three rollers are provided with teeth, the driven roller drives the two counter-rollers or the rollers are linked to each other by a synchronizing means.

In contrast to the known embossing of tippings where multiple bobbin widths are simultaneously embossed by relatively larger embossing rollers than the previously described embossing rollers for innerliners, for embossing wrapping foils and tippings according to the online process, embossing rollers having the same dimensions as for embossing innerliners are used and with regard to tippings, generally only one web that corresponds to one bobbin width is embossed that comprises two tipping strips.

The devices described hereinafter now allow performing the operations of embossing, wrapping, and singulating cigarettes with tippings online, rapidly and accurately and with broad design possibilities. Furthermore, they also permit a very high embossing quality since an online production process allows a better process control.

Figure 1:
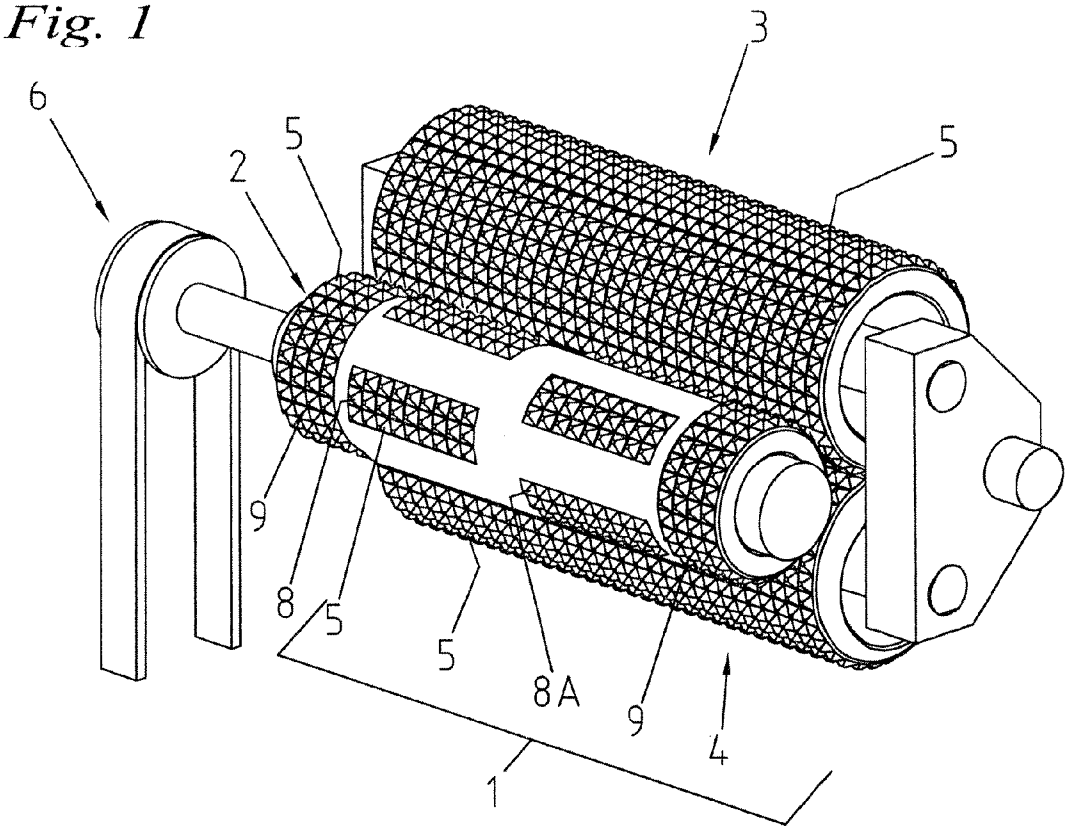
FIG. 1 shows the essential parts of a first device of the invention schematically and in a perspective view.

The device 1 according to FIG. 1 is based on a pinup-pinup configuration that has been successfully used for embossing innerliners where all three rollers 2, 3 and 4 are provided with teeth 5 that project from the surface and a tooth of one roller engages between four teeth of the other rollers, whereby a self-synchronization is achieved and the embossing accuracy is improved and the drive mechanism is simplified. First roller 2 is driven by a symbolically illustrated drive 6, the drive alternatively being a motor.

Figure 41:
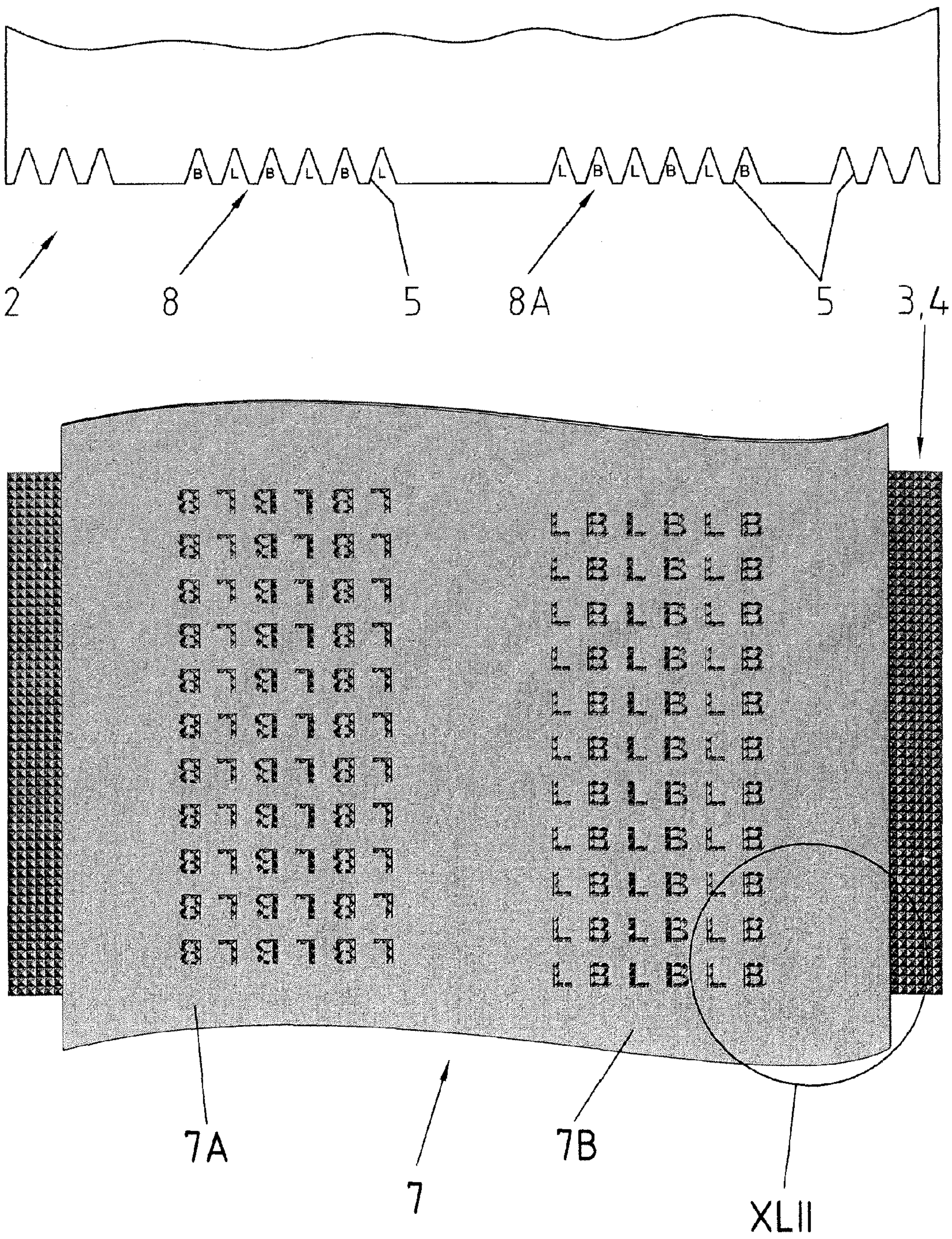
FIG. 41 shows a foil strip embossed by means of the device according to FIG. 1 and the embossing roller according to FIG. 36.

According to FIG. 1, three rollers are used for producing a foil strip 7, see FIG. 41. Roller 2 that is driven via drive 6 is provided with logo lines 8, 8A which e.g. comprise the logo LB, and at both edges with tooth rows 9 for a better transmission of the driving force to the counter-rollers. The term “logo lines” is meant to designate lines on which logos of any kind formed by teeth 5 are arranged. In this example, counter-rollers 3 and 4 only comprise teeth 5.

Figure 42:
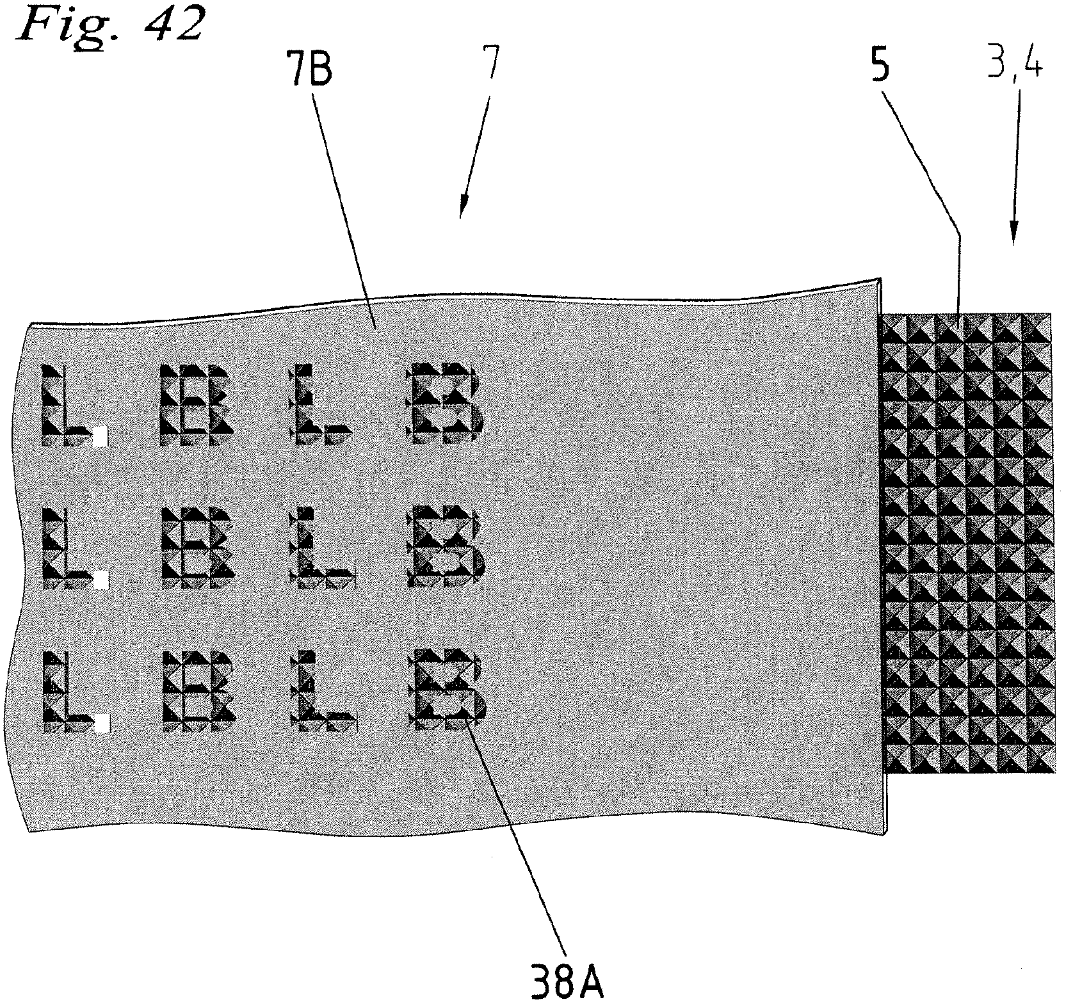
FIG. 42 shows the enlarged detail XLII from FIG. 41.

In contrast to the embossing rollers for embossing innerliners, where the logos are produced by completely removing or modifying the teeth in the corresponding locations and the remaining teeth serve for satinizing, according to the invention, for embossing wrapping foils, the corresponding embossing roller is only provided with teeth in those locations where logos formed of a number of teeth are to be embossed, as appears particularly in FIGS. 41 and 42.

Figure 2:
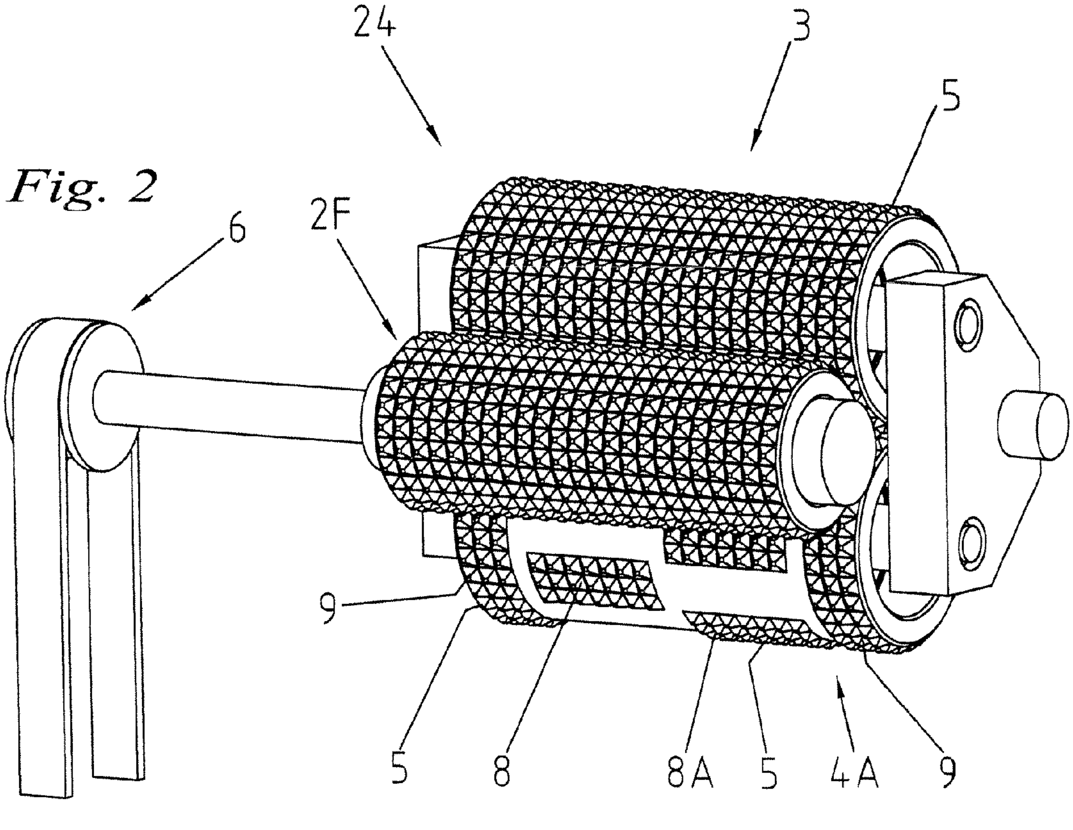
FIG. 2 shows an embodiment variant of the device of FIG. 1.
Figure 3:
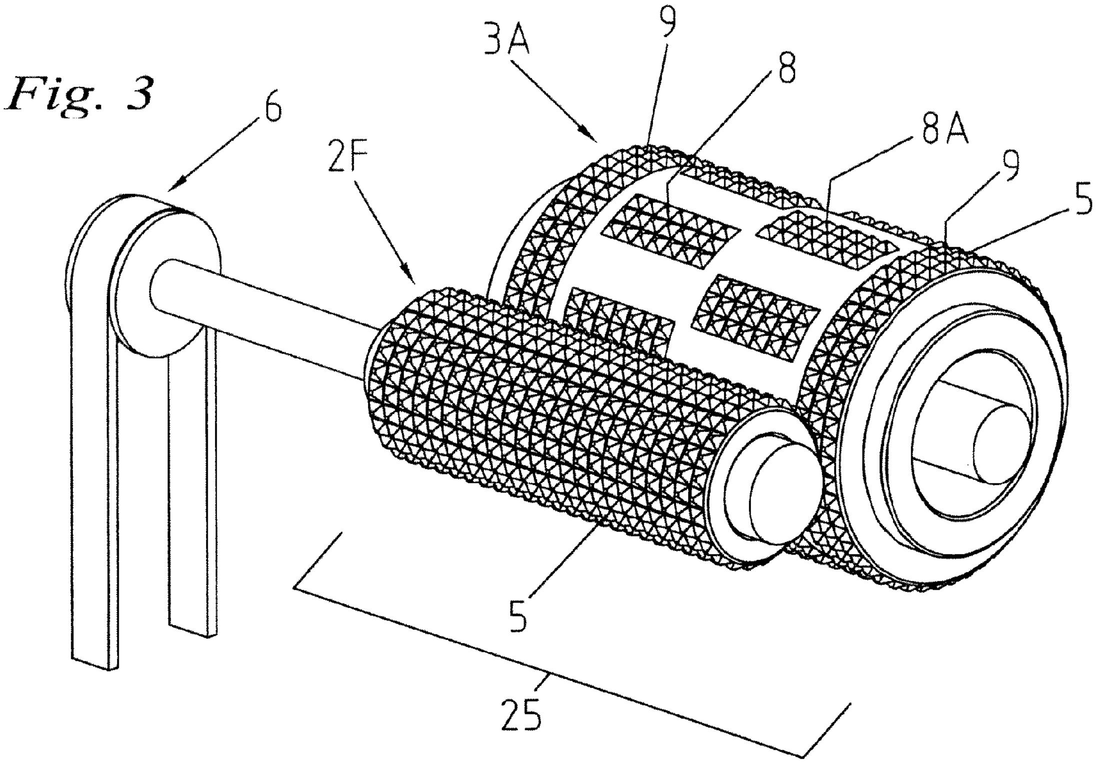
FIG. 3 shows another embodiment variant of the device of FIG. 1.

In the process of satinizing and simultaneously embossing logos on innerliners, the metallized surface of the packaging foil is embossed so that in almost all cases the driven roller is provided with the logos whereas for embossing wrapping foils it may be advantageous to provide the logos on one of the non-driven embossing rollers in order to obtain positive projecting logos thereon, see FIG. 2 where one of the two non-driven rollers, i.e. embossing roller 4A of device 24 is provided with the logo lines. This may also apply to the case where the device only comprises two rollers as illustrated in FIG. 3 where device 25 comprises a driven roller 2F and an embossing roller 3A that is driven by the latter and provided with the logo lines. In this latter case, the embossing roller has twice the circumference of the driven roller.

Hereinafter, all rollers provided with logo and/or reinforcement lines and rows and possibly with individual teeth will be defined as embossing rollers while the remaining rollers, whether directly driven or indirectly via synchronizing means, are defined as counter-rollers. However, this does not exclude that more than one roller of a device may be provided with logo and/or reinforcement lines and rows. Moreover it is assumed that the foil strip is always passed between the rollers in the same orientation with respect to a particular side thereof.

Figure 10:
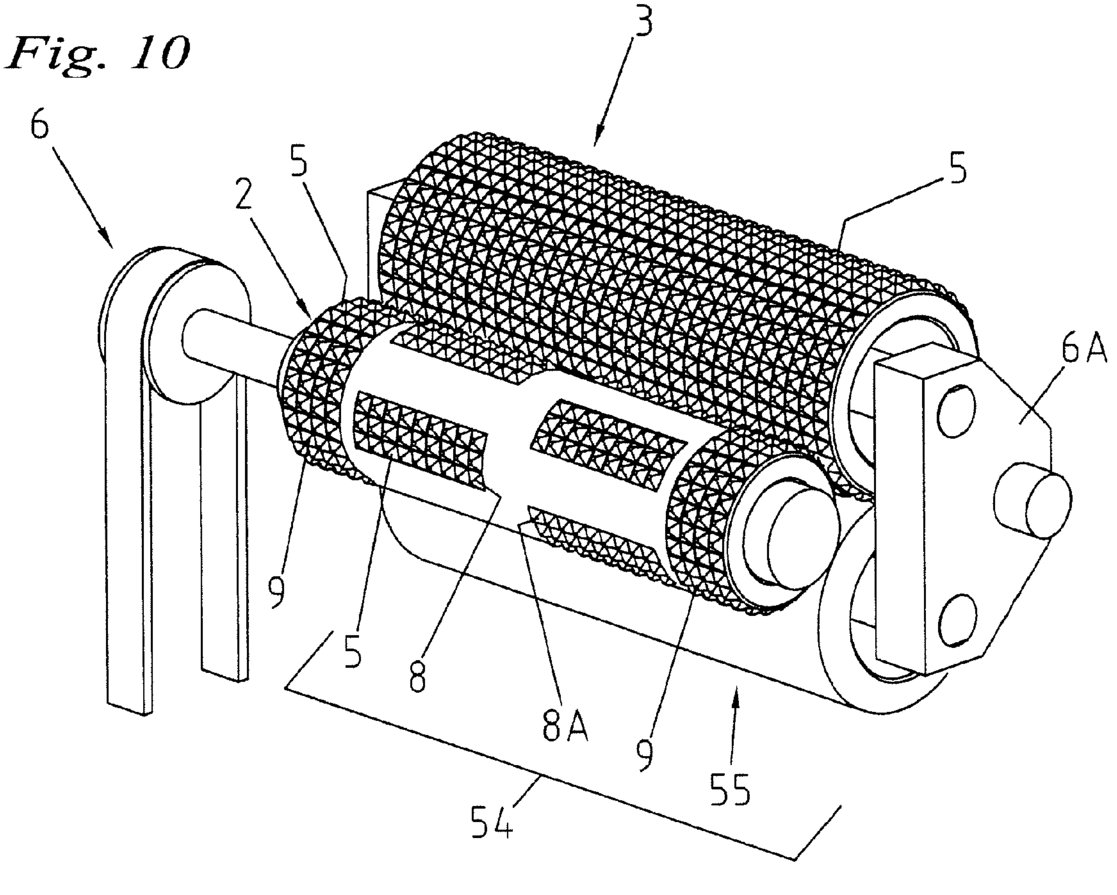
FIG. 10 shows another exemplary embodiment of the device of FIG. 4.

In difference to the prior art EP 1 867 470 A1, the diminishing of the number of teeth in the logos 8, 8A does not create any problems in view of pitching since there are always a row of teeth on both sides of the roller for preventing it, whereas FIGS. 10, 10A of the above mentioned prior art document show only sychronizing teeth on one side, thus not preventing pitching in all situations.

In the exemplary embodiments, teeth 5 are pyramidal with a square horizontal projection while their tips may be flattened up to 25%. However, a number of further pyramidal teeth having a variety of other horizontal projections and shapes will be depicted below, e.g. pyramidal teeth having a rectangular horizontal projection, which may e.g. have a greater length of their footprint in the direction of the longitudinal axis than in the other direction. Alternatively, for certain applications where the counter-rollers are driven via synchronizing means, conical or frustoconical teeth may be provided. The teeth may have a pitch, i.e. a distance between tips, of 0.05 mm to 0.4 mm, for a theoretical height without the flattened tops of 0.03 mm to 0.3 mm.

Furthermore, individual teeth or groups of teeth may be differently shaped as it is known from the previously cited prior art. As already described in the mentioned prior art more than once, the rollers are preferably supported so as to be capable of a deviation of a certain amount in all three coordinate directions.

In FIGS. 4 to 14, exemplary embodiments from WO 02/07671 to the applicant of the present invention have been adapted according to the invention. Device 40 has three rollers, the same embossing roller 2 as in the preceding examples that cooperates with a first counter-roller 41 and a second counter-roller 42, first roller 2 being driven by a drive 6 while the two counter-rollers are neither driven nor synchronized to the driven roller by synchronizing elements such as gearwheels but only driven via foil strip 7 here.

In contrast to the preceding examples, the three embossing rollers do not have the same structure. In the exemplary embodiment according to FIG. 4, driven embossing roller 2 is the same as previously while first counter-roller 41 is provided with grooves 43 running around the entire circumference and arranged in parallel to each other such that teeth 5 of embossing roller 2 engage in the grooves. Rings 44 formed between grooves 43 are also outwardly tapered and flattened so as to engage between the frustopyramidal teeth 5.

Analogously, second counter-roller 42 has longitudinal ridges 45 that are also outwardly tapered and flattened like rings 44 in such a manner that longitudinal ridges 45 cooperate with teeth 5 of embossing roller 2. Thereby, the rings or longitudinal ridges, respectively, may affect the appearance of the embossing patterns produced by the embossing roller provided with teeth. By means of such embossing roller assemblies it is possible to produce different embossing patterns or signs by variations of teeth 5 or of rings 44 or of longitudinal ridges 46, i.e. by altering the height, the flanks, or the edges of the teeth, rings, or longitudinal ridges, or by applying patterns to their upper surfaces.

Figure 4:
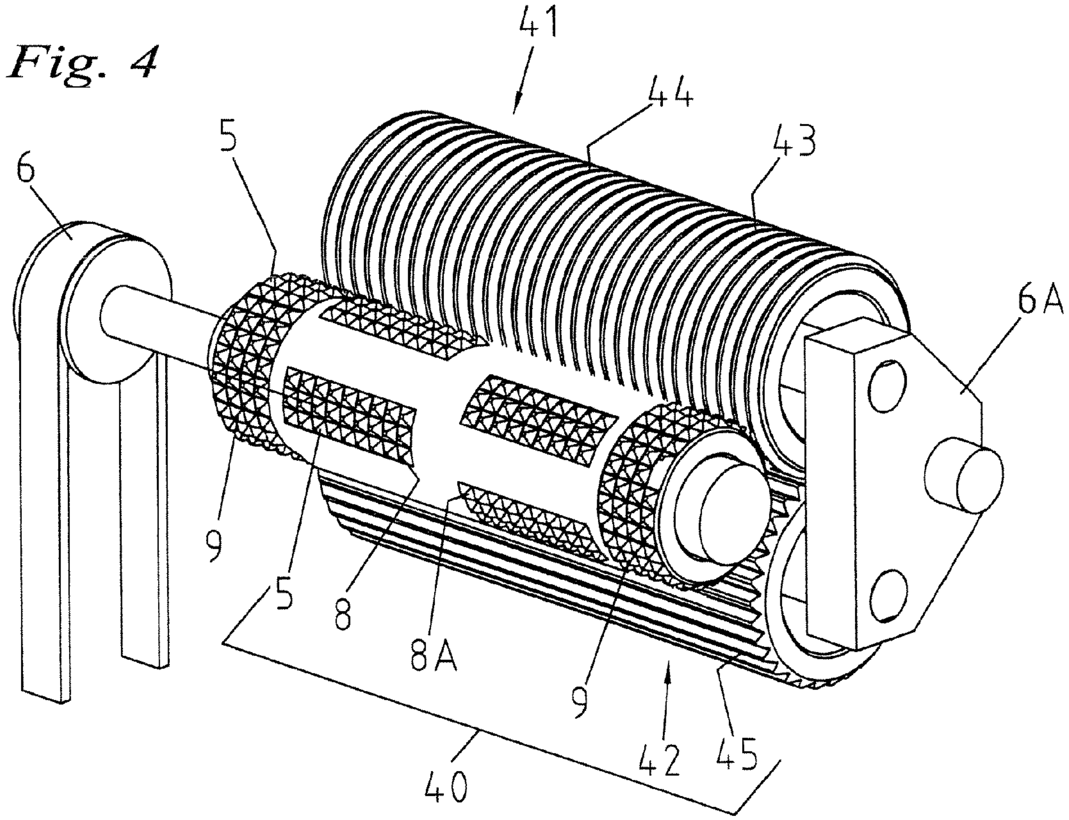
FIG. 4 shows another embodiment of the invention with three rollers schematically and in a perspective view.

In FIG. 4 or 5 it is symbolically indicated that the two counter-rollers interlock with embossing roller 2, but this is not necessarily always the case. It is also possible that the first or the second counter-roller, respectively, only interlocks or is only capable of interlocking with the first or the preceding roller, respectively. Furthermore it may be advantageous for certain applications to provide more than a total of three embossing rollers having different surface structures. Furthermore, both the diameter and the length of the individual rollers may differ. In addition to the metal rollers, soft rollers may be used.

FIG. 5 shows a second device 47 comprising the same embossing roller 2 and counter-rollers 41 and 42 provided with the rings and longitudinal ridges, respectively, whereas the order of the counter-rollers is reversed as compared to the order according to FIG. 4 and, seen in the traveling direction of the material 7, the embossing roller provided with the longitudinal ridges enters into engagement first and then the embossing roller provided with the rings.

In the exemplary embodiment according to FIG. 6, device 48 comprises a driven roller 2F and, like in FIG. 4, counter-roller 41 provided with rings 44 as the second roller. The following embossing roller 4A is a similar one as according to FIG. 2. In FIGS. 6 and 6A it is illustrated how rollers 2, 41, and 4A are forcedly synchronized by gearwheels 48, 49, 50. A forced synchronization is also advisable particularly if the material is subject to strong warping in the embossing procedure.

Figure 7:
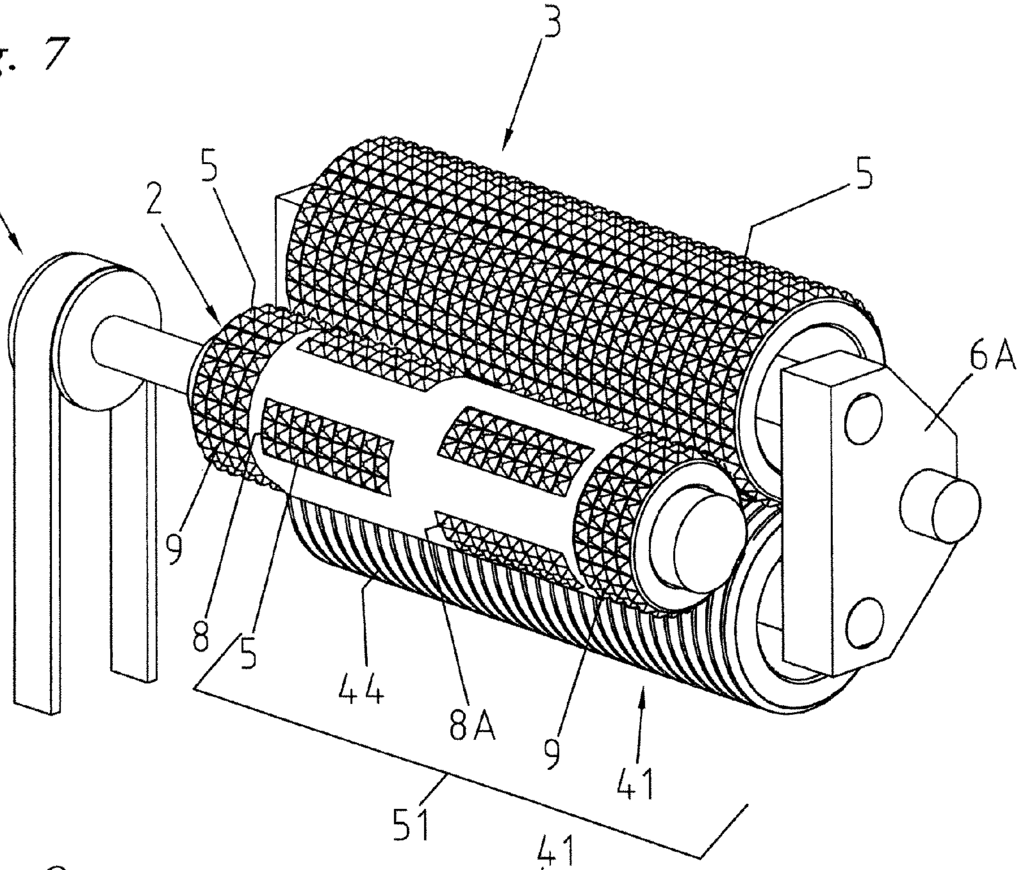
FIG. 7 shows a variant of the example of FIG. 6.
Figure 8:
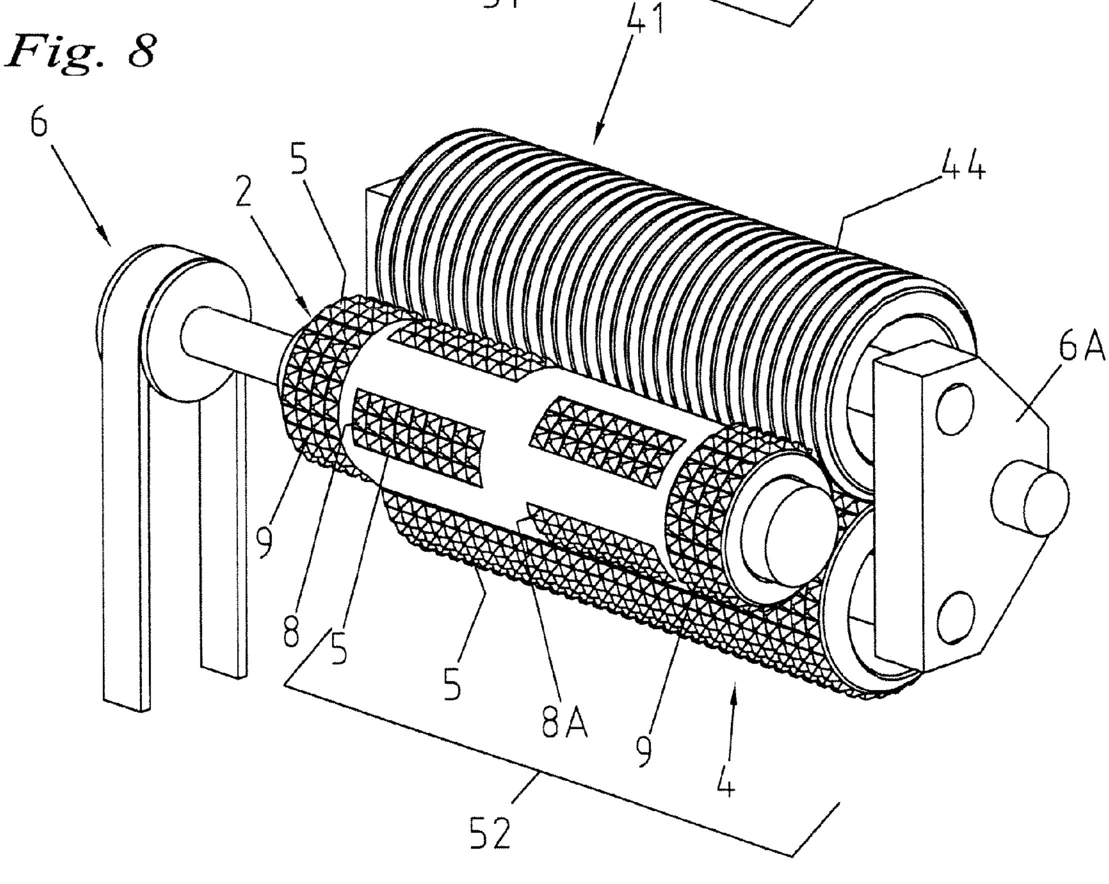
FIG. 8 shows another exemplary embodiment of the device of FIG. 4.

As a variant of FIG. 6, the device 51 according to FIG. 7 is illustrated where embossing roller 2 cooperates with toothed roller 3 and ring roller 41. In device 52 according to FIG. 8, the two counter-rollers are reversed, and the rollers of these two embodiments are not forcedly synchronized.

Figure 9:
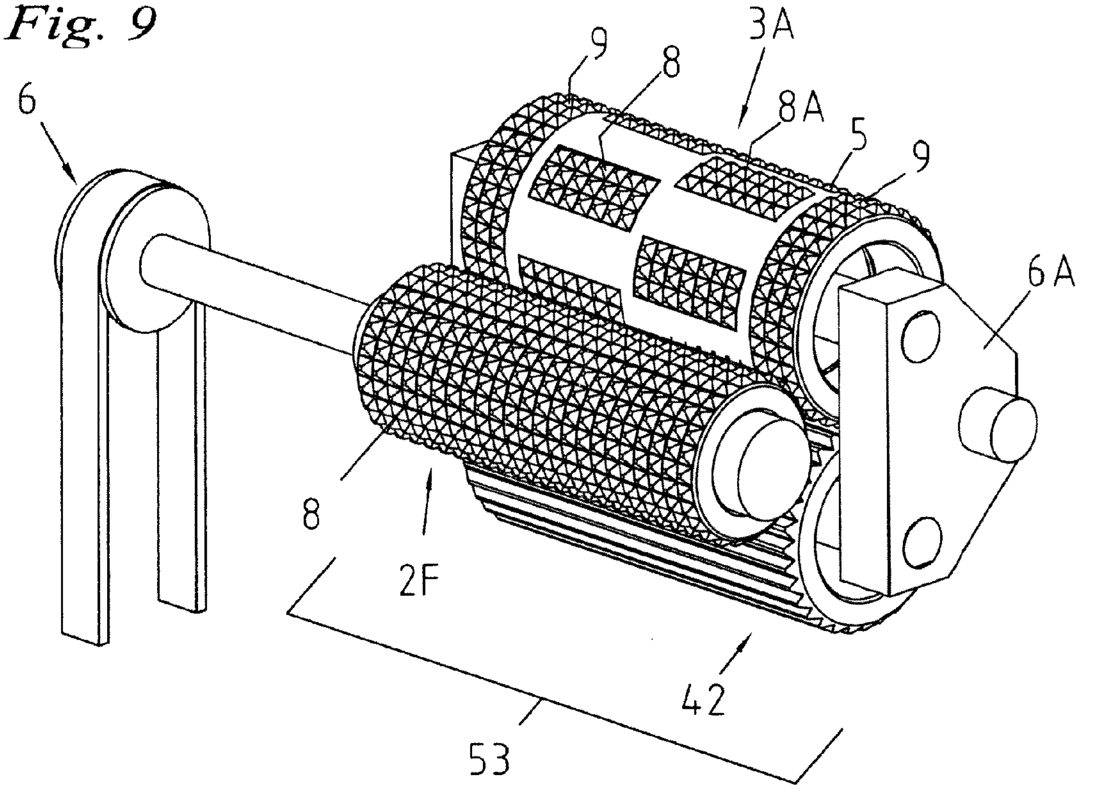
FIG. 9 shows a variant of the example of FIG. 8.

In device 53 according to FIG. 9, a combination of driving roller 2F with embossing roller 3A and longitudinal ridge roller 42 is illustrated which require no forced synchronization.

Figure 11:
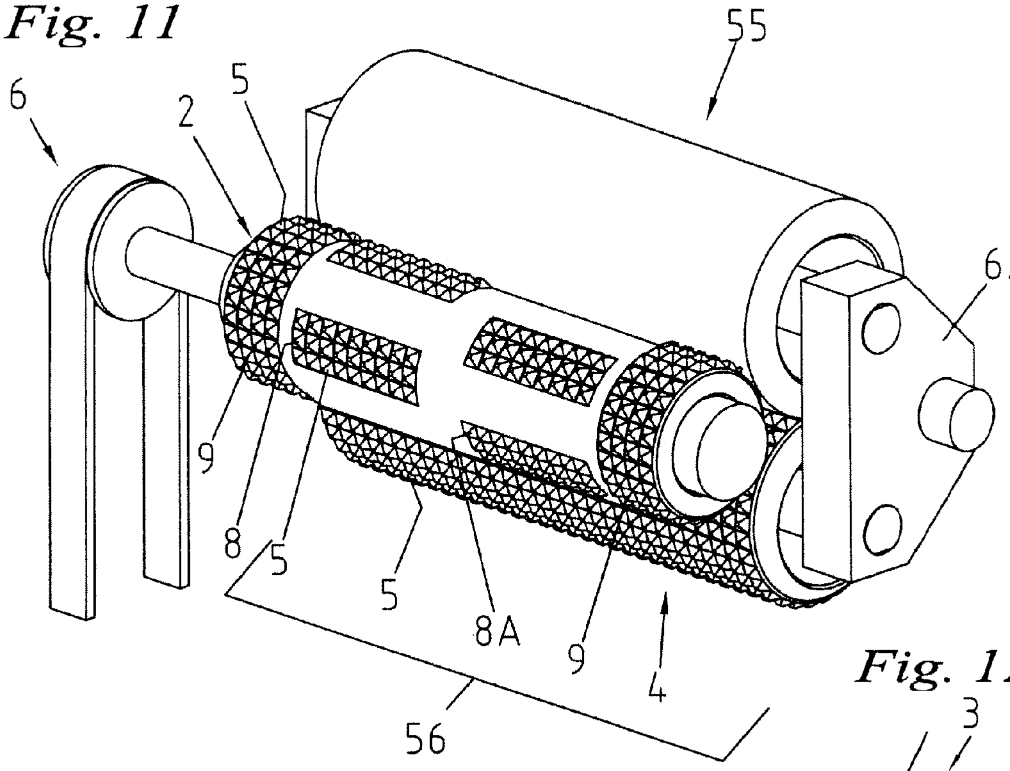
FIG. 11 shows a variant of the example of FIG. 10.

In FIGS. 10 and 11, another variant is depicted where the first roller in device 54 is embossing roller 2 and the second roller is toothed roller 3 according to the preceding examples while, in contrast to the preceding examples, the third roller is a rubber roller 55 having a comparatively smooth surface. In device 56 according to FIG. 11, the order of rollers 3, 4, and 55 is reversed.

Figure 12A:
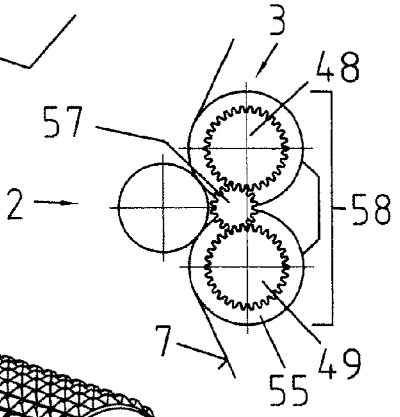
FIG. 12A shows a synchronizing gear of the arrangement of FIG. 12 in a sectional view.
Figure 12:
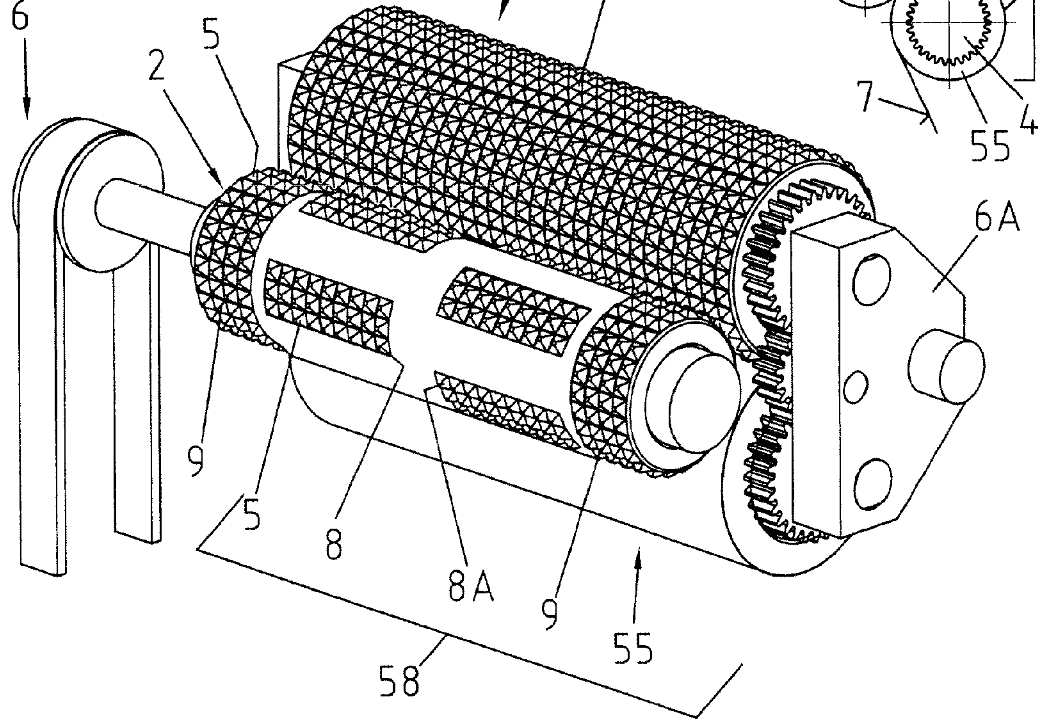
FIG. 12 shows another variant of FIG. 10.

FIGS. 12 and 12A illustrate a variant of the embodiment of FIG. 10 where embossing roller 2 and toothed roller 3 in device 58 have the same teeth 5, i.e. a pinup-pinup configuration, and the two non-driven rollers 3 and 55 are forcedly synchronized by a gear comprising gearwheels 48, 49, and 57.

Based on these examples, variations are possible: Thus, rubber roller 55 may be used instead of ring roller 41 or longitudinal ridge roller 42. Furthermore, the bearings or the two yokes 6A receiving the two bearings are schematically depicted in the figures. This is meant to also indicate that the roller axles may be supported individually, in groups, or in common. Here also, the embossing rollers need not have the same diameters and the same lengths, but in contrast to the first example, if the synchronization is achieved by gearwheels, unless they are equal, the diameters of the rollers must have an integral ratio while their lengths may vary individually.

Figure 13:
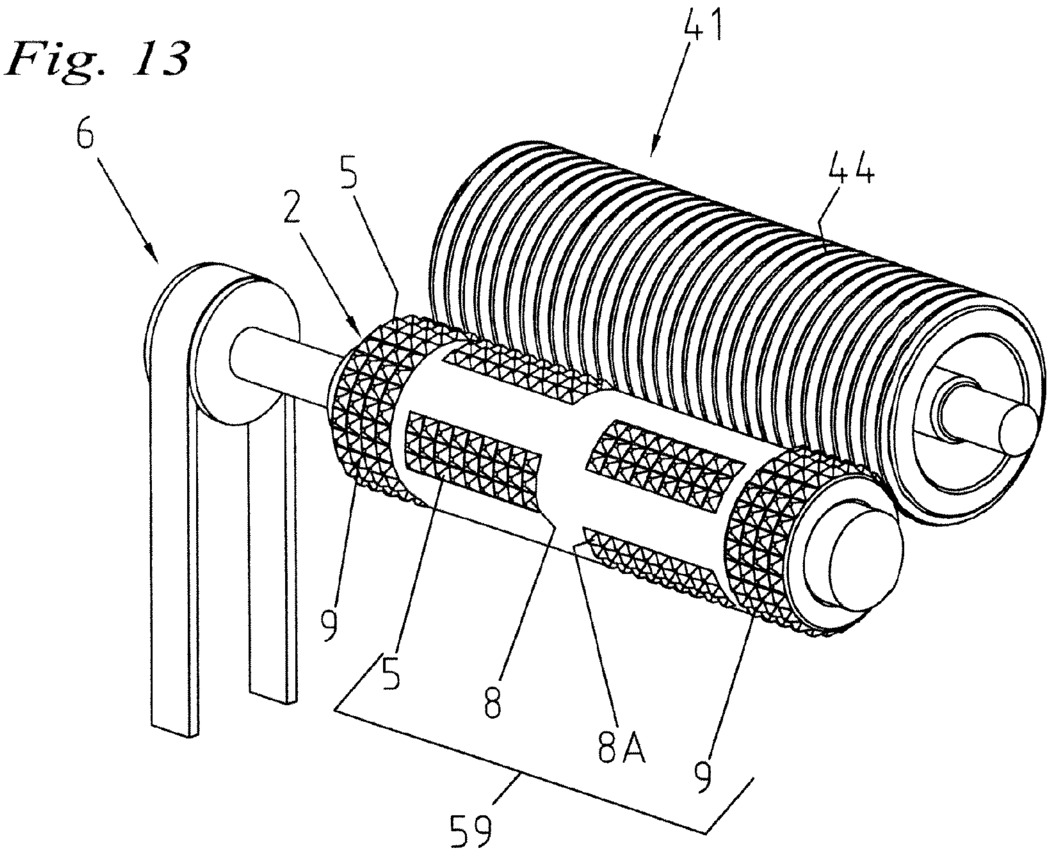
FIG. 13 shows another exemplary embodiment having two embossing rollers.
Figure 14:
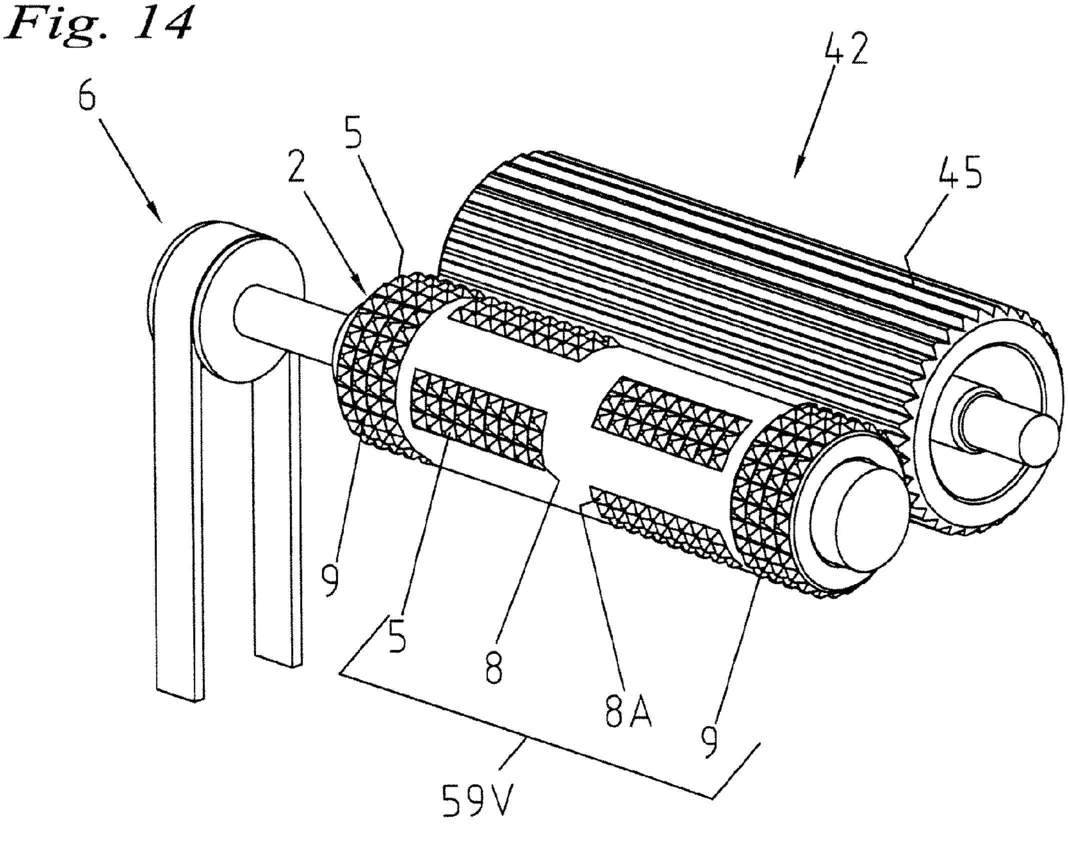
FIG. 14 shows an embodiment variant of FIG. 13.

Further tests have shown that most of the above-mentioned advantages can also be achieved with a device having two embossing rollers according to FIG. 13 or 14. The only very schematically illustrated device 59 in FIG. 13 also comprises embossing roller 2 provided with the logo and/or reinforcement lines and rows as well as a second roller 41 provided with rings 44 and grooves 43. Furthermore, drive 6 is depicted while the yokes are not shown.

FIG. 14 shows a device 59A comprising embossing roller 2 and second roller 42 provided with longitudinal ridges 45. The remaining elements are the same as in the preceding devices. What has been said of the three-roller system according to FIGS. 4-12 analogously applies to the two-roller system according to FIGS. 13 and 14, however with the advantage of its greater simplicity. If particularly difficult materials have a curling tendency after a treatment with two rollers, a following smoothing device, e.g. with smooth rubber rollers, may be used.

Based on EP-A-1 925 443 to the applicant of the present invention, FIGS. 15 to 22 illustrate further exemplary embodiments of counter-rollers that allow achieving better embossing results in certain embossing processes and paper grades. With the use of the rollers described below, not only a better breaking and neutralization of the paper substrate with regard to wrinkling, tubing, and curling is achieved, but particularly also an esthetically significantly improved foil surface. Ultimately, such a foil surface allows a finer and more precise embossing of very fine structures which serve e.g. for producing authentication features.

Figure 15:
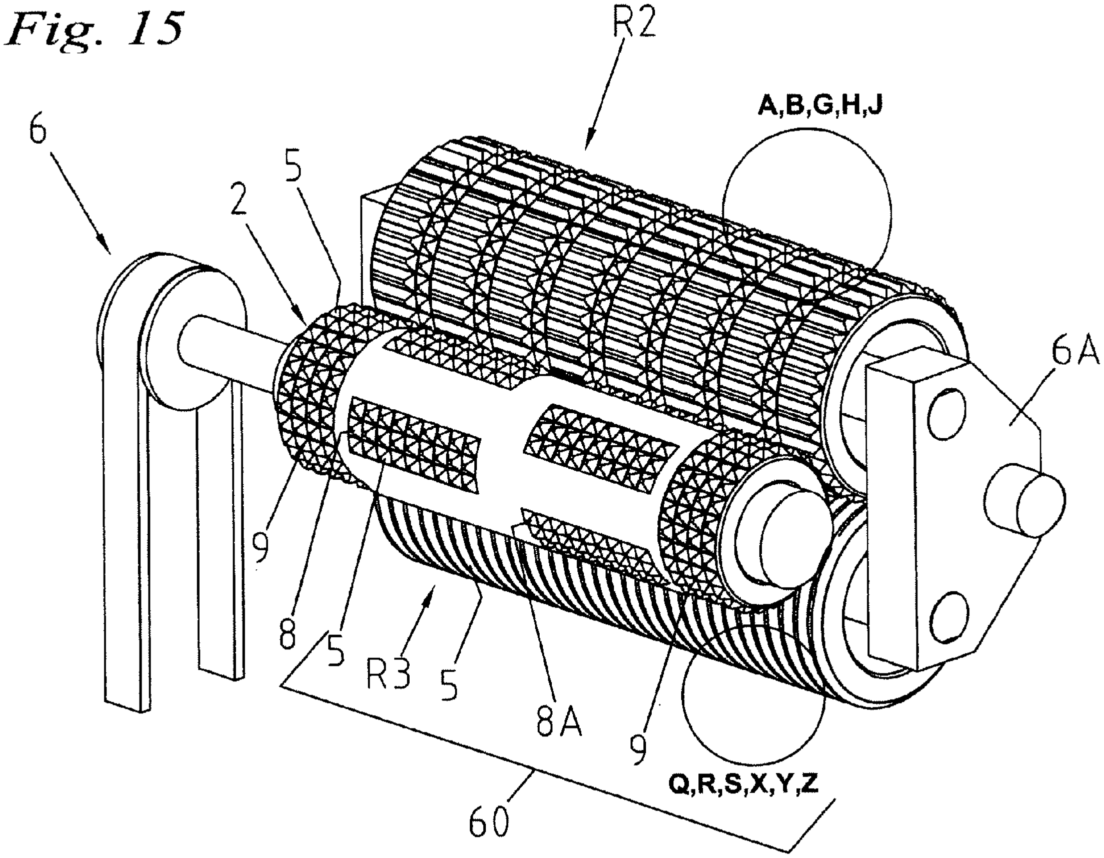
FIG. 15 shows, schematically and in a perspective view, a device with an embossing roller having a homogenous arrangement of teeth that cooperates with two counter-rollers, FIGS. 16 to 19 each show respective structures of the two additional embossing rollers in detail enlargements.

The schematic illustration of FIG. 15 shows a device 60 comprising three rollers, embossing roller 2 being driven by drive 6. Foil 7 first passes through roller pair 2 and R2 and subsequently through roller pair 2 and R3. It follows that the foil first passes through the arrangement of different structures of one of the roller pairs and is subsequently treated in another manner, i.e. inhomogenously, by the surface structure of the second roller pair assembly, thereby resulting in an altogether inhomogeneous treatment of the foil that produces surprising results.

In FIG. 15, as already mentioned in the introduction, embossing roller 2 is provided with homogenously patterned individual teeth 5 as well as with the logo and/or reinforcement lines and rows, the tooth arrangement defining the basic grid GR. The surface structures of counter-rollers R2 and R3 are symbolized by letters A to J and Q to Z, respectively. Upon comparison of FIG. 15 to FIG. 16 it is apparent that the designation R2A denotes surface structure A of counter-roller R2, and R3Q the surface structure Q provided on counter-roller R3, etc.

Figure 16:
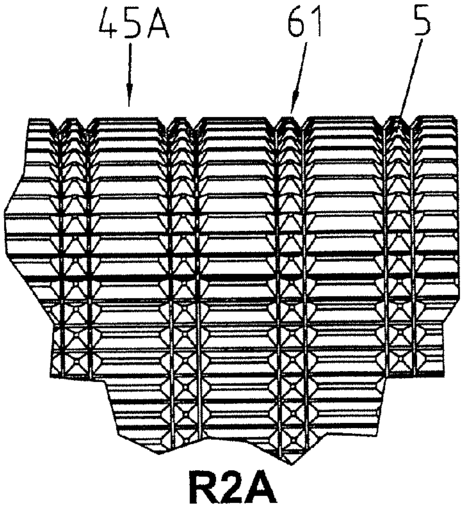
Figure 16:
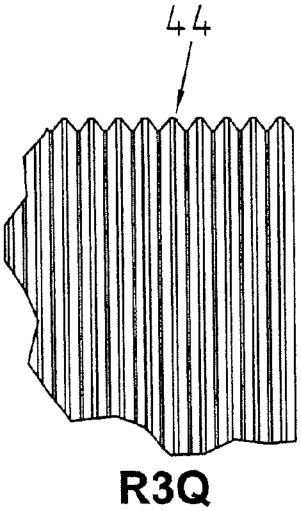

In FIG. 16, a possible surface structure of counter-rollers R2 and R3 is depicted. Surface structure A of the roller surface of R2 according to FIG. 16 is defined by longitudinal ridges 45A that are interrupted by individual structural elements in the form of tooth rows 61, tooth row 61 being composed of individual teeth 5 and the teeth in the present example having a frustopyramidal shape. Therefore, instead of uniform longitudinal ridges as in FIG. 4, the surface of R2 consists of longitudinal ridges that are interrupted by circular tooth rows while the grid of these structural elements is not the same as basic grid GR. Structure Q of third counter-roller R3 here consists of regularly arranged circular ridges 44 as according to FIG. 4.

Figure 17:
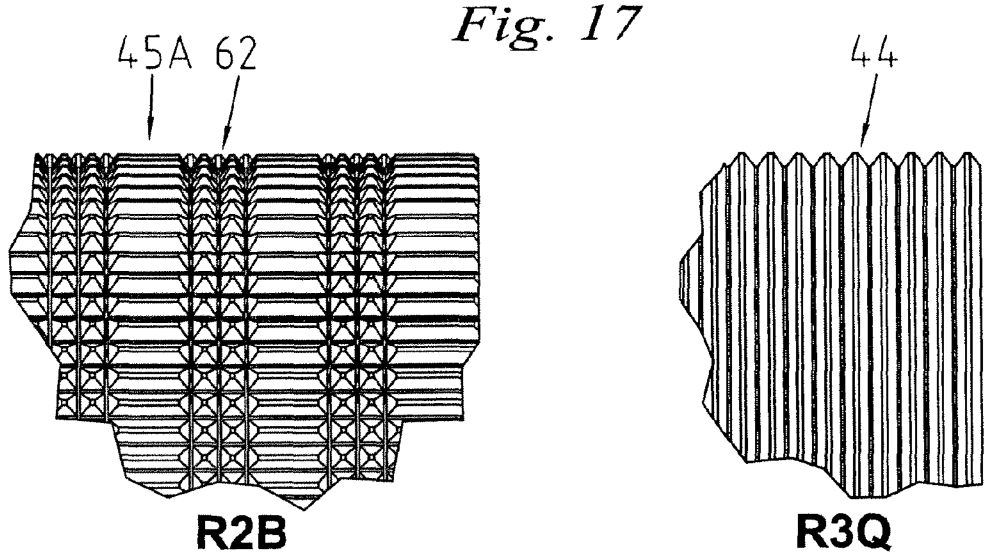
Figure 18:
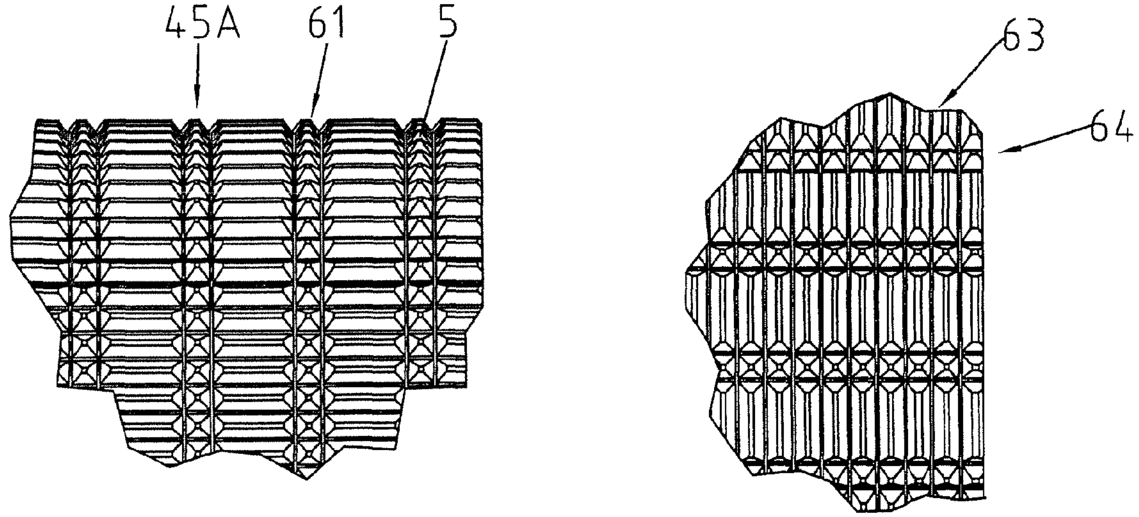

In FIG. 17 it is shown that surface structure B of counter-roller R2 comprises the interrupted longitudinal ridges 45A as well as double tooth rows 62, while it is understood that three or more tooth rows interrupting longitudinal ridges 10 may alternatively be provided. Counter-roller R3 has the same surface structure Q as in FIG. 16. In FIG. 18 it is shown that counter-roller R2 has the same surface structure A as in FIG. 16 while counter-roller R3 has a surface structure R in which circular ridges 63 are interrupted by longitudinally arranged tooth rows 64, whereby the rows are composed of individual teeth 5.

Figure 19:
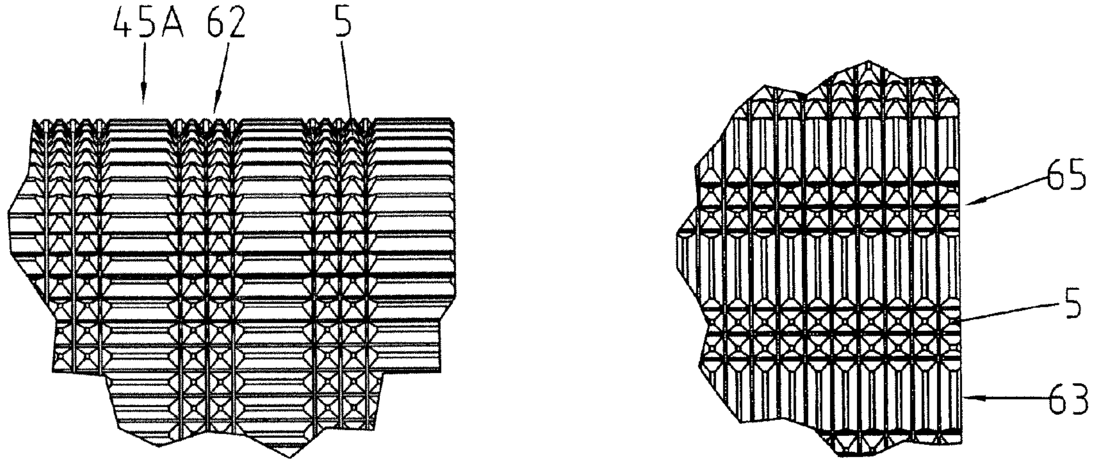

In the illustration of FIG. 19, counter-roller R2 has the same surface structure B as in FIG. 17 while counter-roller R3 has a surface structure S where circular ridges 63 are interrupted by double longitudinal rows 65, the latter again being composed of individual teeth 5.

The description of FIGS. 15 to 19 already shows that a large number of variations are conceivable. Thus, it is of course possible not only to provide structural elements in the form of single or double rows of teeth, but also triple or multiple rows of individual teeth between which longitudinal or circular ridges are arranged.

Furthermore it will be appreciated that both the dimensions of the individual teeth and the distances between the tooth rows may vary, as well as the dimensions and distances of the longitudinal or circular ridges, provided that they are dimensioned and arranged so as to always interlock with or roll off on the grid of teeth of counter-roller R1. It is understood that any desired combination of the indicated roller types of both counter-rollers is possible.

Figure 20:
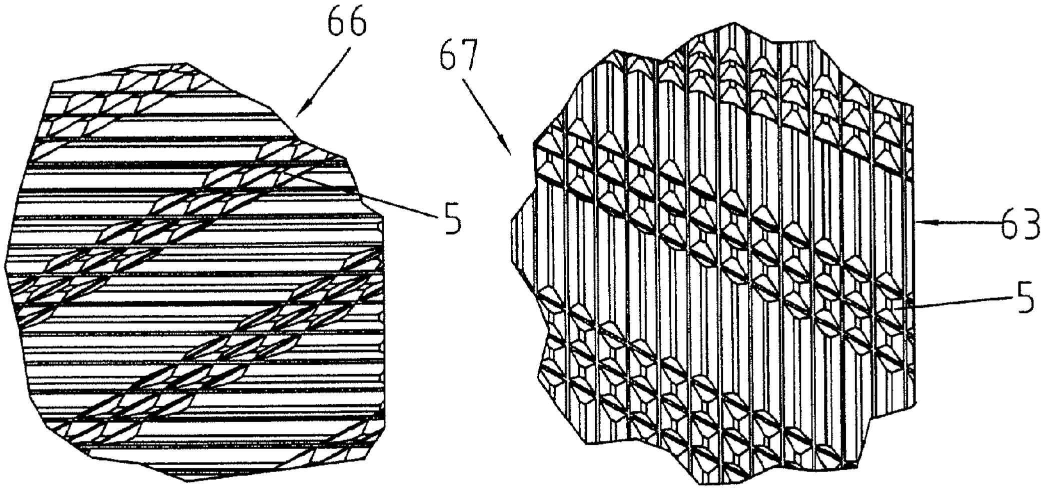
FIG. 20 shows an embodiment variant of the structures of the additional counter-rollers.
Figure 21:
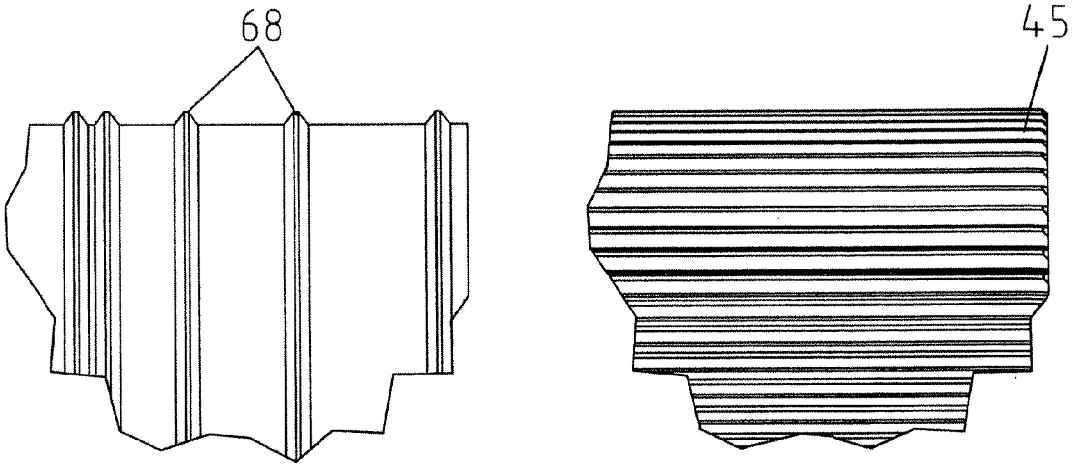
FIGS. 21 and 22 show further embodiment variants of the structures of the additional counter-rollers.
Figure 22:
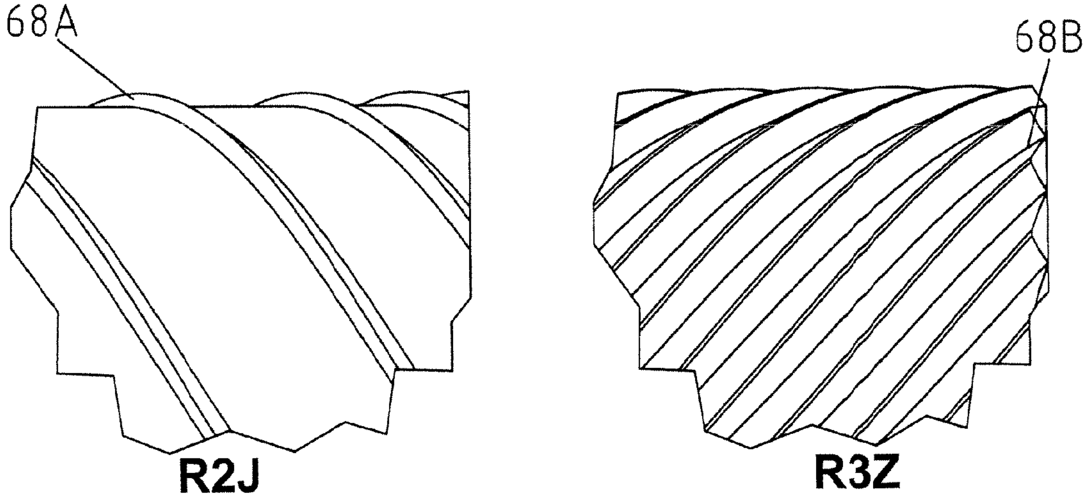

Whereas FIGS. 15 to 19 illustrate surface structures in which the structural elements are arranged orthogonally to the longitudinal axis of the rollers, FIGS. 20 to 22 illustrate surface structures in which the structural elements formed of individual teeth or of continuous ridges are arranged helically.

In FIG. 20, a surface structure G is shown for counter-roller R2 in which structural elements 66 are helically arranged in the same longitudinal ridges 45 as in FIG. 19, e.g. at an angle of 45° with respect to the longitudinal axis, these elements again being composed of tooth rows comprising individual teeth 5. Counter-roller R3 has a surface structure X whose configuration is the mirror image of structure G while structural elements 67 formed of two rows of teeth 5 and arranged at an angle of e.g. 45° with respect to the longitudinal axis of the counter-roller are provided, however. As shown in FIGS. 17, 18, and 19, counter-roller R3 with surface structure X is also provided with rings 44 that are interrupted by structural elements 65.

In FIG. 21 a surface structure H is illustrated for counter-rollers R2 whose structural elements are not composed of rows of individual teeth but of circular ridges 68, the distances between the individual ridges being variable and no longitudinal ridges being provided. Counter-roller R3 has the surface structure Y that is composed of longitudinal ridges 45. Here also, the cooperation of embossing rollers R2 and R3 results in a non-homogenous breaking of the paper fibers.

The counter-rollers according to FIG. 22 can be regarded as being analogous to the counter-rollers according to FIG. 20 in that helically arranged ridges 68A are provided as the structural elements, however without intermediate longitudinal or transversal ridges. Here also, the distances between the individual ridges may be variable. In this example, ridges 68B of counter-roller R3 forming the surface structure Z are helically arranged next to one another. Here also, the interaction of the two counter-rollers R2 and R3 results in a non-homogenous embossing action and thus in a maximum breaking of the paper fibers.

In FIGS. 23 to 32, further variants of roller surfaces and teeth are shown that are based on WO-A1-2009/155720 to the applicant of the present invention. FIG. 23 shows a device 69 with an embossing roller 2 that is depicted here in a different illustration than previously, provided with teeth 70 and the logo and/or reinforcement lines and rows and cooperating with a ring roller 41 and with a toothed roller 4B. Alternatively, the embossing and the toothed roller may be exchanged. Instead of ring roller 41, a ridge roller 42 may be provided.

As appears in FIGS. 24 to 26, the opening angles of the tooth flanks are different in the radial and axial directions. In the radial direction, i.e. according to section XXV-XXV or in the driving direction, respectively, opening angle α between two adjacent flanks 71FR and 72FR of teeth 71 and 72 is smaller than opening angle β between the two axially aligned adjacent tooth flanks 72FA and 73FA of teeth 72 and 73 according to section XXVI-XXVI in FIG. 24.

The theoretical tooth height X, measured from the theoretical tooth tip ZS to tooth bottom ZG1, is greater than tooth height Y between theoretical tooth tip ZS and tooth bottom ZG2, these theoretical tooth tips ZS being located at the same distance from the rotational axis for all teeth and, for the present purposes, at the point of intersection of the tooth flanks. As mentioned, these are theoretical values that do not take account of manufacturing tolerances and of wear. In the present case, the practical tooth heights X' and Y' are indicated too, the difference X'-Y' being the same as for the theoretical tooth heights.

Due to the fact that in the driving direction, the maximum tooth height X resp. tooth flank surface area is provided, the force transmission between the driving embossing roller and the following counter-roller is fully effective. In the axial direction, according to plane IV-IV, no driving force has to be transmitted, and therefore a smaller tooth height is sufficient in this direction.

In this manner it is possible to reduce the minimum distance between the teeth, the result being a finer embossing and an improved processing of the paper of the packaging foil. For the embossing rollers of the prior art mentioned in the introduction, the minimum distances, i.e. the pitch, is approximately 0.3 mm for a tooth height of up to 0.5 mm. The present design of the teeth allows reducing the minimum distance to 0.05 mm.

On this basis, a rectangular design of the tooth bases is possible while conserving the full driving force. Thus, according to FIGS. 27 to 29, length L1 of the base of tooth 75 or of teeth 76 to 79, respectively, in the radial direction may be smaller than length L2 in the axial direction or, according to FIGS. 30 to 32, length L3 of the base of tooth 80 or of teeth 80 to 84, respectively, in the radial direction may be greater than length L4 of this tooth in the axial direction. In this respect it will be noted that the lengths are only schematically depicted as only their difference is significant here.

Opening angle α may be comprised in a range of 40° to 90° and angle β in a range of 60° to 120°, α always being smaller than β. The differences in tooth height, i.e. X minus Y, may be comprised in a range of 0.02 to 0.43 mm.

Figure 33:
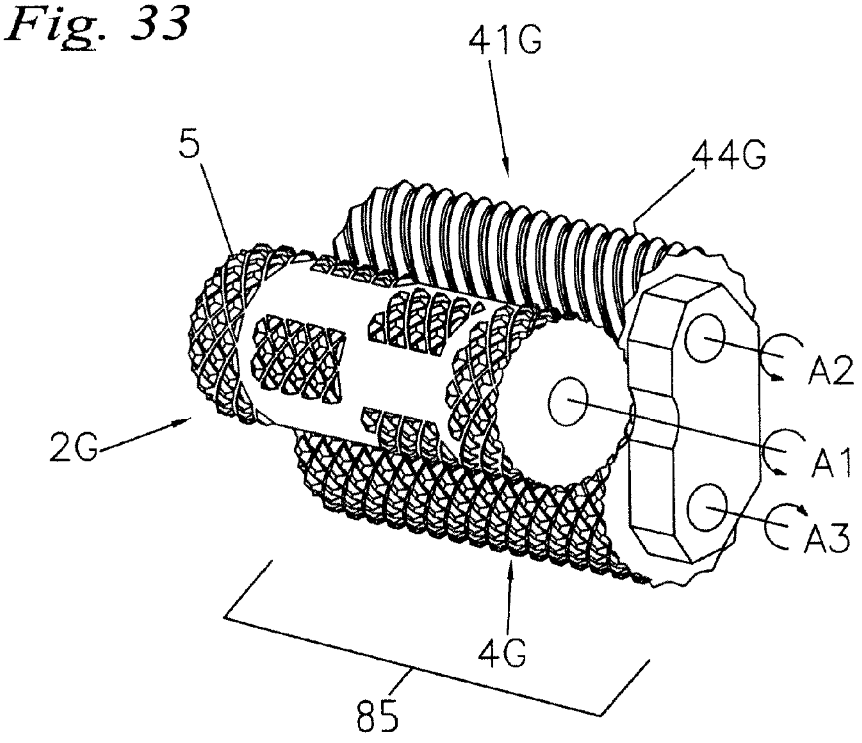
FIG. 33 shows another exemplary embodiment of the invention that is analogous to the above exemplary embodiment according to FIGS. 24 to 32.

In FIG. 33 another device 85 is illustrated where teeth 5 having square or rectangular bases are not arranged in parallel or perpendicularly to roller axes A1, A2, A3 but comprise an angle d. In this exemplary embodiment the angle d is equal to 45°. The angle d may be comprised in a range of greater than 0° to 89°, preferably in a range of 35° to 60°. Embossing roller 2G is provided with the usual logos and the like, toothed roller 4G with teeth 5 only, and ring roller 41G with obliquely arranged rings 44G that may be continuous or interrupted. Individual teeth 5 and rings 44G are both rotated by the angle d relative to the roller axes.

As shown e.g. in FIGS. 1, 33 to 47, driven roller 2, 2A, 2B, 2C, 2D, 2E, 2G has relatively large areas that are not provided with teeth, and since a strip corresponding to a bobbin is being embossed, this may essentially give rise to two problems. Firstly, the foil strip may be subject to warping, which may have consequences particularly in the cutting operation, and if the embossing rollers are not in continuous engagement, the resulting gaps may cause shocks that may quickly destroy the embossing rollers. In the infrequent case where a double strip from two separate bobbins is to be embossed, these problems remain.

The first problem can be solved by an offset arrangement of logo lines 8, 8A; 15, 15A; 16, 16A on each of the two tipping strips 7A and 7B, as shown in the drawings. In the four illustrated exemplary embodiments for embossing tippings according to FIGS. 35, 36 to 38, logo lines 8; 15; 16 of embossing rollers 2, 2A, 2B, 2C are each offset by one line from logo lines 8A; 15A; or 16A.

The result is that no tensions are created when the tipping strips are cut and that the tipping strip portions can subsequently be glued around the cigarette mouthpiece without problems to form a tipping where no seam is visible. This appears in FIG. 43 where two cigarettes 10 and 11 are shown around the ends of which, e.g. with filters, tippings 12 and 13 are wrapped.

Figure 35:
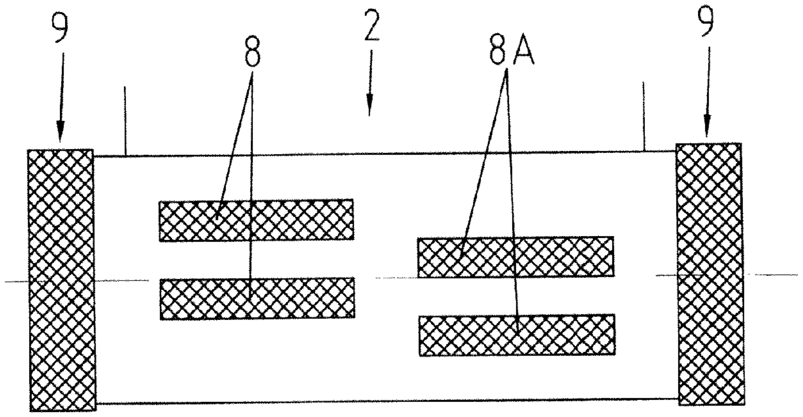
FIG. 35 shows an embossing roller provided with logo lines and rows of teeth on both sides.
Figure 35A:
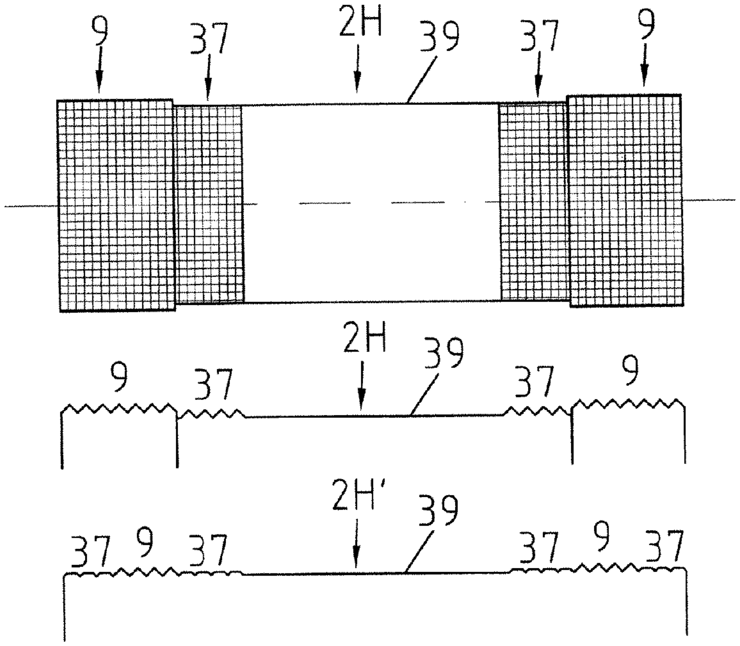
FIG. 35A shows a variant of the embossing roller of FIG. 35 where no logo lines but rows of teeth of different heights are provided.
Figure 36:
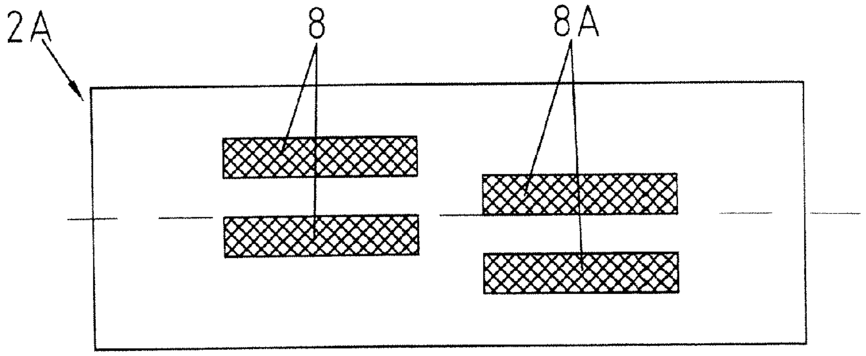
FIG. 36 shows an embossing roller with logo lines but without rows of teeth on both sides.

In the examples according to FIGS. 35 and 36 the teeth are regularly distributed around the entire circumference and the teeth of at least one logo line 8, 8A are always in engagement with teeth of at least another embossing roller. The result is that not only the required driving action of the counter-rollers is ensured but also that a pitching movement of the roller provided with the logos with respect to the other rollers and thus detrimental vibrations are avoided. FIG. 35A shows a variant of the embossing roller of FIG. 35 where no logo lines, but rows of teeth 9 and 37 of different heights relative to a roller surface 39 are provided.

Figure 37:
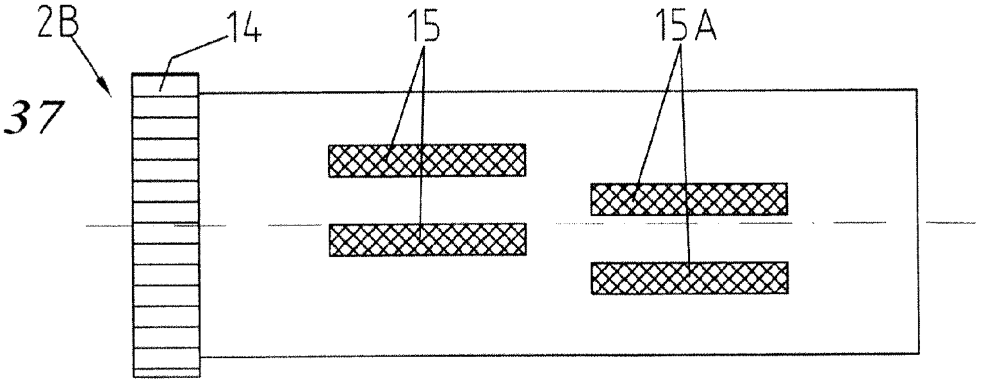
FIG. 37 shows an embossing roller with logo lines and synchronizing means.

Particularly if e.g. according to FIG. 37 logo lines 15, 15A of embossing roller 2B comprise less teeth, or less logo lines 15, 15A are provided than on the embossing roller according to FIG. 35 or 36 and the required driving action of the counter-rollers is no longer ensured by the teeth alone, synchronizing means 14 such as gearwheels, toothed belts, or electronic driving means are used in order to drive the latter synchronously to the embossing roller.

Figure 38:
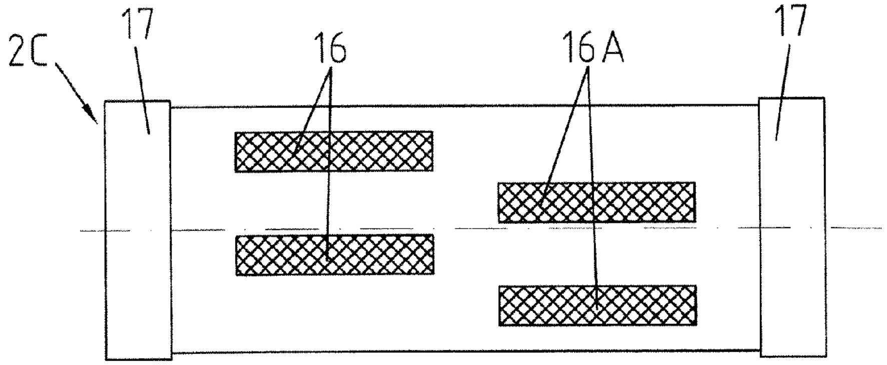
FIG. 38 shows an embossing roller provided with logo lines and a step on both sides.

FIG. 38 schematically illustrates the situation where logo lines 16, 16A are designed so that a pitching movement cannot be avoided unless suitable measures are taken. Therefore, in this exemplary embodiment, stepped portions 17 are provided on both sides of driven roller 2C to ensure that the embossing roller is always in the required contact with the counter-rollers so that a pitching movement is avoided and thus the distance between rollers always remains constant.

All illustrated logo lines have in common that they are arranged and shaped such that when the wrapping strips are glued on, the logos applied thereto appear seamlessly at the junctions thereof, i.e. without visible disturbances in the continuity of the logo that may e.g. be a logotype.

FIG. 41 illustrates the structure of logos 8, 8A provided on embossing roller 2 that is shown in a sectional view and the structure and arrangement of the embossed logos 38, 38A on foil strip 7 with the two tipping strips 7A and 7B on an enlarged scale and schematically, the embossing roller being omitted in the latter case and one of counter-rollers 3 or 4 being viewed. The foil strip is only structured in those locations where logo lines were provided on embossing roller 2 and is narrower than the embossing rollers.

In FIG. 42 it is shown even more clearly that the letters of the logos on the foil strip are formed by impressions that have been produced by corresponding teeth 5 on driven embossing roller 2. Analogously thereto, the logos may be provided on one of the counter-rollers, see FIGS. 2 and 3, in which case these logos are formed by elevations if the orientation of the sides of the foil strip with respect to the rollers remains the same.

Figure 43:
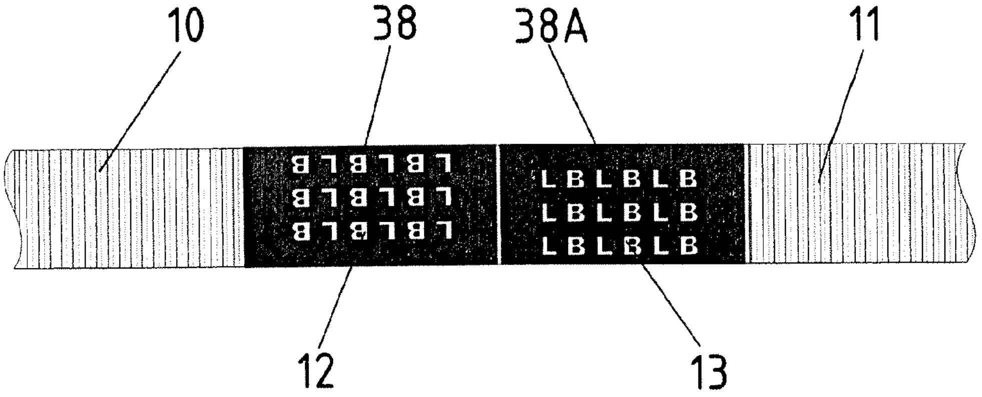
FIG. 43 shows two cigarette tips whose mouthpieces are arranged adjacent to one another and each provided with a tipping.

FIG. 43 illustrates a portion of a tipping strip that is glued onto two cigarette tips 10, 11, the following step being that of cutting and separating the two tipping strip portions. In the present exemplary embodiments, logos 38 and 38A consist of the two letters LB, but any letters, signs, or authentication features may be composed from any constellation of teeth.

Analogously to the known embossing units for innerliners, an embossing unit for tippings or other wrapping foils may consist of only two embossing rollers, in which case counter-roller 3A has twice the diameter of driven embossing roller 2F, as shown in FIG. 3, and is provided with logos 8, 8A and tooth rows 9. Alternatively, the counter-roller may be a ring roller 41 according to FIG. 13 or a ridge roller 42 according to FIG. 14.

As mentioned in the introduction, in the methods of the prior art, the tippings are generally embossed offline on multiple bobbin widths, then separated into single bobbin widths, and applied to the cigarette tips. However, the device of the invention allows the entire process to be implemented in a more accurate and simple manner online, i.e. during the packaging process.

Figure 34:
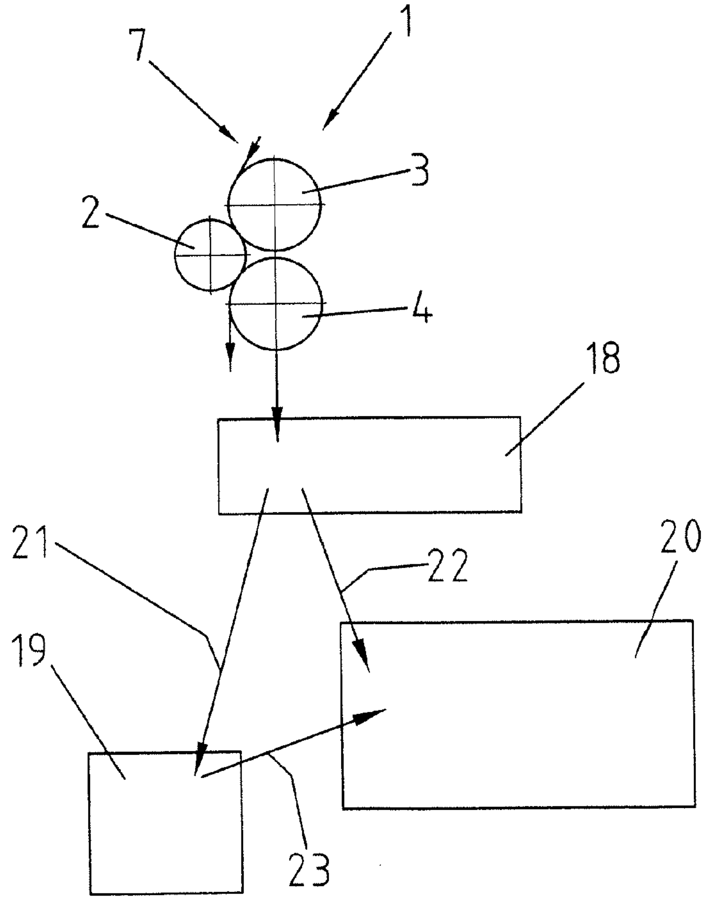
FIG. 34 shows a simplified flow diagram of an online embossing and manufacturing process of tippings.

In the strongly simplified flow diagram of FIG. 34, foil strip 7 is embossed in embossing unit 1 and subsequently the double tipping is wrapped around two cigarette tips and the cigarettes are separated in gluing and cutting unit 18. From there, the individual cigarettes are either delivered to a feeding robot 19 and from there to online packing line 20 in order to be packaged in the innerliner, or directly to the online packing line, as indicated by arrows 21, 22, 23. This online process, combined with the relatively easy exchangeability of the embossing rollers and the large range of design possibilities, allows a significant increase in productivity and in design possibilities. The ability to produce the tippings online is also due to the absence of any pitching movements, independently of the width of the foil strip.

In the exemplary embodiment according to FIGS. 41 to 43, embossing and the application of tippings is illustrated, but a foil embossed as described may also serve for wrapping other objects than cigarettes, especially in cases where it is important that no warping occurs and an inexpensive embossing of the most diverse patterns e.g. also on white paper is desired.

In FIGS. 44 to 47, the embossing of reinforcement zones on wrapping paper and the use of the latter for wrapping boxes is shown as a further application of the devices of the invention. At the same time, these reinforcement zones also have a decorative character and the reinforcement lines and rows on the embossing rollers and thus the corresponding reinforcement zones on the foil need not comprise entire rows of teeth but may alternatively be composed of separate areas, see FIG. 39. Particularly the reinforcement rows on the embossing rollers prevent a pitching movement of the latter in most cases.

The technique of embossing small indentations or elevations in the pinup-pinup process makes it possible to use relatively thin wrapping foils for packaging cigarette packets and boxes for high-grade goods such as watches, electronic parts, expensive pharmaceuticals, or foods such as chocolate or cheese with or without logos in the online process that are provided with reinforcement zones in critical locations, i.e. at the edges where there is a risk that the foil may be torn. Due to the fact that the foil is embossed in these locations by means of the A device of the invention, the risk of ruptures is reduced. Moreover, the very fine and accurate embossing ensures that once it has been opened, the original package cannot be reclosed without evidence. This security is enhanced when the fine logotypes and the like connect seamlessly after wrapping. In this regard it is important, as with the tippings, that the foil will not warp after cutting.

Figure 39:
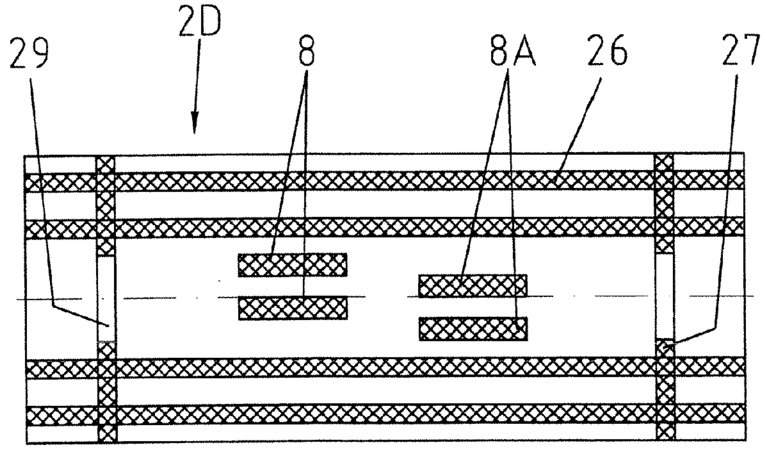
FIG. 39 shows an embossing roller with logo lines and reinforcement lines and rows.

A foil embossed by embossing roller 2D according to FIG. 39 is arranged around box 30 according to FIG. 44 is such a manner that reinforcement zones 31 and 32 embossed by reinforcement lines and rows 26 and 27 are situated at the edges of the box while one or several sides may be provided with logos 38, 38A. The gaps 29 in the vertical reinforcement rows 27 shown in FIG. 39 are optional and are shown as one possibility.

Figure 40:
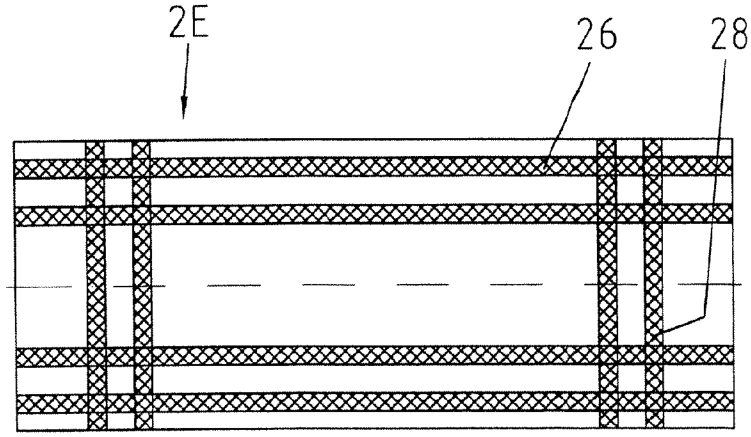
FIG. 40 shows an embossing roller without logo lines and with reinforcement lines and rows.

The wrapping foil for box 33 in FIG. 45 is provided with reinforcement zones 31 and 32 only, which have been embossed by reinforcement lines and rows 26 and 28 of the embossing roller 2E of FIG. 40. In FIG. 46, a wrapping foil around a triangular box 34 is shown as a variant whose reinforcement zones 31 and 32 and logos 38, 38A have been embossed by an embossing roller that corresponds to embossing roller 2D of FIG. 39.

The embossed wrapping paper according to FIG. 47 further exhibits fine horizontal lines 35 as well as vertical rows 36 which have both a decorative effect and act as reinforcement zones. It goes without saying that the symbolically illustrated logos and reinforcement zones in the drawings stand for a very large range of design possibilities.

The invention claimed is:

1. A device for embossing wrapping foils, comprising:

an embossing roller; and a counter-roller, the embossing roller and the counter-roller being driven via a drive, wherein the embossing roller and the counter-roller are designed in a pinup-pinup configuration, the embossing roller having teeth that project from a roller cylinder, the teeth of the embossing roller being pyramidal or conical and at least partly serving for driving the counter-roller, wherein the embossing roller comprises tooth rows arranged on both side edges of the roller cylinder for forming reinforcement zones on a foil, a toothed area for forming a logo on the foil, and surface areas with no teeth between the toothed area and the tooth rows, the tooth rows configured to avoid a pitching movement of the embossing roller independently of an arrangement of the surface areas with no teeth and of a width of the foil.

2. The device according to claim 1, wherein an arrangement of the tooth rows on the roller cylinder with respect to the toothed area and the surface area with no teeth, and distances in or between the tooth rows, the toothed area, and the surface areas with no teeth are such that teeth of at least one of the tooth rows for forming the reinforcement zones and the toothed area for forming the logo are always in engagement with corresponding teeth, grooves, or ridges of the counter-roller.

3. The device according to claim 1, wherein the tooth rows for avoiding the pitching movement comprise respective stepped portions at both side edges of the embossing roller with reinforcement lines and rows.

4. The device according to claim 1, wherein the toothed area for forming the logo comprises logo lines with teeth.

5. The device according to claim 1, wherein the toothed area for forming the logo comprises logo lines with teeth and the embossing roller comprises synchronizing elements cooperating with other rollers.

6. The device according to claim 1, wherein the embossing roller comprises tooth lines extend longitudinally along a surface of the embossing roller arranged to form longitudinally extending reinforcement zones in the foil.

7. The device according to claim 1, further comprising a second counter-roller, wherein the second counter-roller cooperates with the embossing roller.

8. The device according to claim 1, wherein the counter-roller is a driven counter-roller, and the embossing roller cooperates with the driven counter-roller.

9. The device according to claim 7, wherein the counter-roller and the second counter roller include individual teeth, and the counter-roller and the second counter-roller include at least one of circular ridges, helical ridges, and longitudinal ridges the ridges being flattened and a cross-section of the ridges tapering outwardly.

10. The device according to claim 1, wherein the teeth of the embossing roller are pyramidal, the pyramidal teeth have an essentially rectangular horizontal projection, a first opening angle between essentially radially aligned adjacent tooth flanks being smaller than a second opening angle between essential axially aligned adjacent tooth flanks and a first tooth height in a radial direction, measured from a first tooth tip to a first tooth bottom, being greater than a second tooth height in the axial direction measured from a second tooth tip to a second tooth bottom.

11. The device according to claim 10, wherein edges of the pyramidal teeth are arranged either orthogonally to a longitudinal axis of the roller or at an angle of between 1° and 89° thereto.

12. The device according to claim 1, wherein a base of each of the teeth is square.

13. The device according to claim 1, wherein the counter-roller is journalled for an excursion in at least one of a longitudinal direction of an axle, in a direction of a contact pressure and in a traveling direction of a material that is to be embossed.

14. The device according to claim 1, wherein individual teeth of the embossing roller are modified in height or shape in order to produce embossed signs whose appearance varies depending on a viewing angle.

15. The device according to claim 1, wherein the embossing roller includes a plurality of toothed areas for forming logos, and teeth of the toothed areas for forming the logos arranged such that during a passage of the foil, at least two sections of the foil are configured to be embossed such that a logo embossed on one section is offset from a logo embossed on another section in a traveling direction of the foil.

16. The device according to claim 15, wherein the foil includes at least one of paper, synthetic material, and or is a hybrid foil.

17. The device according to claim 1, wherein the embossing roller further includes a second toothed area for forming a second logo, the toothed area, the second toothed area, and the tooth rows are separated from each other by the surface areas with no teeth, and the toothed area and the second toothed area are arranged offset from each other in a circumferential direction around the embossing roller.

18. A method of embossing wrapping foils by a device, the device including an embossing roller and a counter-roller, the embossing roller and the counter-roller being driven by a drive, the embossing roller having teeth that project from a roller cylinder, the teeth of the embossing roller being pyramidal or conical and at least partly serving for driving the counter-roller, wherein the embossing roller includes tooth rows arranged on both side edges of the roller cylinder, the tooth rows arranged for forming reinforcement zones on a foil, a toothed area for forming a logo on the foil, and surface areas with no teeth arranged between the toothed area and the tooth rows, the tooth rows configured to avoid a pitching movement of the embossing roller independently of the surface areas with no teeth and of a width of the foil, the method comprising the step of:

feeding the foil between the embossing roller and the counter-roller for embossing the foil with the logo by the toothed area of the embossing roller with no embossing on the foil at portions of the foil corresponding to the surface areas with no teeth.

19. The method according to claim 17, further comprising the steps of:

forming reinforcement zones into the foil with the tooth rows, the reinforcement zones arranged to surround the logo on the foil; and cutting the foil along the reinforcement zones.

* * * * *